(12) United States Patent
Muse et al.

(10) Patent No.: US 11,769,465 B1
(45) Date of Patent: Sep. 26, 2023

(54) IDENTIFYING REGIONS OF VISIBLE MEDIA DATA THAT BELONG TO A TRIGGER CONTENT TYPE

(71) Applicant: Optum, Inc., Minnetonka, MN (US)

(72) Inventors: Jon Kevin Muse, Thompsons Station, TN (US); Gregory J. Boss, Saginaw, MI (US); Komal Khatri, Cedar Park, TX (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 17/453,710

(22) Filed: Nov. 5, 2021

(51) Int. Cl.
*G09G 5/10* (2006.01)
*G06T 11/60* (2006.01)
(Continued)

(52) U.S. Cl.
CPC ... *G09G 5/10* (2013.01); *G06T 7/20* (2013.01); *G06T 11/60* (2013.01);
(Continued)

(58) Field of Classification Search
CPC .... G09G 5/10; G09G 5/02; G09G 5/30; G09G 2320/0271; G09G 2320/0276; G09G 2320/0666; G09G 2320/0686; G09G 2354/00; G09G 2360/144; G09G 2360/16; G09G 2380/08; G09G 5/04; G09G 5/227; G09G 2320/06; G08G 2320/0626; G08G 2320/066; G08G 2320/10; G08G 2320/103; G08G 2320/106; G06T 11/001; G06T 11/60; G06T 7/20; G06T 2207/10016; G06T 2207/10024; G06T 2207/20172; H04N 1/56;
(Continued)

(56) References Cited

U.S. PATENT DOCUMENTS 7,394,468 B2   7/2008  Hofman et al.
8,305,399 B2  11/2012  Takaba
(Continued)

FOREIGN PATENT DOCUMENTS

EP   2245594 A1   11/2010
JP   2007193192 A  *  8/2007 .................. G09G 5/02
(Continued)

OTHER PUBLICATIONS

"Anatomy of a Video Signal," SUNNYAN.KR, accessed from https://tistory.sunnyan.kr/entry/Anatomy-of-a-Video-Signal#:~:text=The%20signal%20for%20a%20single,of%20each%20new%20video%20line, accessed on Jan. 26, 2022, 9 pp.
(Continued)

*Primary Examiner* — Wesner Sajous
(74) *Attorney, Agent, or Firm* — Shumaker & Sieffert, P.A.

(57) ABSTRACT

A computing system includes a storage device and processing circuitry. The processing circuitry is configured to obtain an image frame that comprises a plurality of pixels that form a pixel array. Additionally, the processing circuitry is configured to determine that a region of the image frame belongs to a trigger content type. Based on determining that the region of the image frame belongs to the trigger content type, the processing circuitry is configured to modify the region of the image frame to adjust a luminance of pixels of the region of the image frame based on part on an ambient light level in a viewing area of the user; and output, for display by a display device in the viewing area of the user, a version of the image frame that contains the modified region.

20 Claims, 6 Drawing Sheets

(51) Int. Cl.

| | | |
|---|---|---|
| *G06T 7/20* | (2017.01) | |
| *G06V 30/14* | (2022.01) | |
| *G09G 5/02* | (2006.01) | |
| *G09G 5/30* | (2006.01) | |
| *G06T 11/00* | (2006.01) | |
| *H04N 1/60* | (2006.01) | |
| *H04N 5/57* | (2006.01) | |
| *H04N 9/64* | (2023.01) | |
| *H04N 9/69* | (2023.01) | |
| *H04N 9/73* | (2023.01) | |
| *H04N 9/77* | (2006.01) | |
| *H04N 13/144* | (2018.01) | |
| *H04N 19/167* | (2014.01) | |

(52) U.S. Cl.
CPC ... *G06V 30/1444* (2022.01); *G06T 2207/10016* (2013.01); *G09G 2320/0666* (2013.01); *G09G 2320/0686* (2013.01); *G09G 2354/00* (2013.01); *G09G 2360/144* (2013.01); *G09G 2360/16* (2013.01); *G09G 2380/08* (2013.01)

(58) Field of Classification Search
CPC ....... H04N 1/60; H04N 1/6027; H04N 1/6075; H04N 1/6077; H04N 5/57; H04N 5/58; H04N 5/72; H04N 5/93; H04N 9/3182; H04N 9/44; H04N 9/47; H04N 9/64; H04N 9/646; H04N 9/68; H04N 9/69; H04N 9/73; H04N 9/74; H04N 9/77; H04N 9/87; H04N 13/144; H04N 13/183; H04N 13/354; H04N 19/142; H04N 19/154; H04N 19/157; H04N 19/167; H04N 19/172
USPC ........................................................ 345/589
See application file for complete search history.

(56) References Cited

U.S. PATENT DOCUMENTS

| | | | |
|---|---|---|---|
| 8,477,234 | B2 | 7/2013 | Tanigawa et al. |
| 8,768,020 | B2 | 7/2014 | Ferguson |
| 9,153,055 | B2 | 10/2015 | Solcz |
| 9,430,954 | B1 | 8/2016 | Dewhurst |
| 10,067,565 | B2* | 9/2018 | Ramaprakash et al. ............. A61B 5/7275 |
| 10,109,092 | B1 | 10/2018 | Hitchings, Jr. |
| 10,742,923 | B2 | 8/2020 | Rechner et al. |
| 10,911,797 | B2 | 2/2021 | Griffiths |
| 11,017,017 | B2 | 5/2021 | Trim et al. |
| 2006/0192851 | A1* | 8/2006 | Sugahara et al. .. G11B 27/3027 348/E13.064 |
| 2014/0153825 | A1 | 6/2014 | Jones et al. |
| 2015/0290454 | A1* | 10/2015 | Tyler et al. ............ G06F 3/012 607/134 |
| 2017/0293356 | A1* | 10/2017 | Khaderi et al. ........ G06F 3/147 |
| 2018/0088669 | A1* | 3/2018 | Ramaprakash et al. ............. A61M 21/00 |
| 2020/0143519 | A1 | 5/2020 | Gordon et al. |
| 2020/0234432 | A1* | 7/2020 | Rose et al. ............ A61B 5/742 |
| 2020/0312038 | A1* | 10/2020 | Samec et al. ...... G02B 27/0172 |
| 2021/0160557 | A1* | 5/2021 | Speed et al. ....... H04N 21/8193 |
| 2021/0398357 | A1* | 12/2021 | Samec et al. ........ A61B 5/4082 |

FOREIGN PATENT DOCUMENTS

WO 2009/090586 A1 7/2009

OTHER PUBLICATIONS

"Color Blindness," Wikipedia, The Online Encylopedia, accessed from https://en.wikipedia.org/wiki/Color_blindness#:~:text=Peo ple%20with%20total%20color%20blindness,cone%20cells%2C% 20which%20sense%20color, accessed on Jan. 26, 2022, 28 pp.

Reuven Nimrod et al., Cisco Systems, Inc., "Adapting videos and images to determined visually related impairments", Sep. 8, 2016, IP.com Prior Art Database, Disclosure Number: IPCOM000247443D, pages 1-3. (Year: 2016).

Winnemoller et al., "Real-Time Video Abstraction," Northwestern University, ACM Transactions on Graphics, DOI: 10.1145/ 1179352.1142018, Jul. 2006, 7 pp.

* cited by examiner

IDENTIFYING REGIONS OF VISIBLE MEDIA DATA THAT BELONG TO A TRIGGER CONTENT TYPE

TECHNICAL FIELD

This disclosure relates to computing systems for analyzing visible media data.

BACKGROUND

Images and videos may cause some medical conditions to develop or worsen. For example, bright objects in video data can cause a seizure-prone person to develop a seizure. Furthermore, images and videos may include features that are difficult for some people to perceive. For example, colorblind people might not be able to perceive contrasting color areas in an image. This means that some people may experience difficulties when viewing images and videos.

SUMMARY

This disclosure describes techniques for processing visible media data (e.g., image data and video data) in order to help persons with medical conditions view images and videos while managing one or more medical conditions. Objects (e.g., bright objects and flashing objects) in videos may cause a seizure-prone person to develop a seizure, and colorblind persons may have difficulty perceiving areas of contrasting color in images. A system may process visible media data in order to identify parameters of the data. The system may determine whether the data includes areas that belong to any trigger content types. Subsequently, the system may output the data to a display device for viewing by a user. The system may perform one or more actions in order to improve a user's experience in viewing images and videos based on identified trigger content types. These actions may include any one or combination of altering the data to suppress potentially harmful characteristics of the data, generating content describing objects depicted by the data, overlaying descriptive content on the data for display by the display device, and outputting one or more warnings.

In one aspect, this disclosure describes a computing system comprising a storage device; and processing circuitry having access to the storage device. The processing circuitry is configured to: obtain an image frame that comprises a plurality of pixels that form a pixel array, wherein the storage device is configured to store the image frame; and determine that a region of the image frame belongs to a trigger content type, wherein the region of the image frame is a subset of the pixels that form the pixel array, and wherein the trigger content type is a type of image content that may provoke a seizure in a user, and the processing circuitry is configured to. As part of determining that the region of the image frame belongs to the trigger content type, the processing circuitry is configured to determine a first set of parameters that apply to an entire area of the image frame; determine a second set of parameters that apply to the region of the image frame; and determine that the region of the image frame belongs to the trigger content type based on a comparison of the first set of parameters with the second set of parameters. Based on determining that the region of the image frame belongs to the trigger content type, the processing circuitry is configured to modify the region of the image frame to adjust a luminance of pixels of the region of the image frame based in part on an ambient light level in a viewing area of the user. The processing circuitry is configured to output, for display by a display device in the viewing area of the user, a version of the image frame that contains the modified region.

In another example, this disclosure describes a method includes: obtaining, by processing circuitry having access to a storage device, an image frame that comprises a plurality of pixels that form a pixel array; storing, by the storage device, the image frame; and determining, by the processing circuitry, that a region of the image frame belongs to a trigger content type, wherein the region of the image frame is a subset of the pixels that form the pixel array, and wherein the trigger content type is a type of image content that may provoke a seizure in a user. As part of determining that the region of the image frame belongs to the trigger content type, the method comprises: determining a first set of parameters that apply to an entire area of the image frame; determining a second set of parameters that apply to the region of the image frame; and determining that the region belongs to the trigger content type based on a comparison of the first set of parameters with the second set of parameters. Based on determining that the region of the image frame belongs to the trigger content type, the method comprises modifying, by the processing circuitry, the region of the image frame to adjust a luminance of pixels of the region of the image frame based in part on an ambient light level in a viewing area of the user. Additionally, the method comprises outputting, by the processing circuitry for display by a display device in the viewing area of the user, a version of the image frame that contains the modified region.

In another example, this disclosure describes a computer-readable medium comprising instructions that, when executed by a processor, causes the processor to: obtain an image frame that comprises a plurality of pixels that form a pixel array; store the image frame; and determine that a region of the image frame belongs to a trigger content type, wherein the region of the image frame is a subset of the pixels that form the pixel array, and wherein the trigger content type is a type of image content that may provoke a seizure in a user. As part of determining that the region of the image frame belongs to the trigger content type, the instructions cause the processor to determine a first set of parameters that apply to an entire area of the image frame; determine a second set of parameters that apply to the region of the image frame; and determine that the region of the image frame belongs to the trigger content type based on a comparison of the first set of parameters with the second set of parameters. Based on determining that the region of the image frame belongs to the trigger content type, the instructions cause the processor to modify the region of the image frame to adjust a luminance of pixels of the region of the image frame based in part on an ambient light level in a viewing area of the user. Furthermore, the instructions cause the processor to output, for display by a display device in the viewing area of the user, a version of the image frame that contains the modified region.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

This disclosure describes techniques for processing visible media data (e.g., image data and video data) in order to aid persons with certain medical conditions. For example, bright lights, moving lights, blinking lights, or flashing lights can induce seizures in seizure-prone persons. Identifying and suppressing bright objects in video data may decrease a risk that a seizure-prone person will develop a seizure while watching video data. Suppressing a bright object may include, for example, decreasing a brightness of the object relative to areas proximate the object in the video data.

Furthermore, persons with achromatopsia can experience difficulty in identifying some objects in video data. Labelling a color of some objects in video data may aid persons with achromatopsia in viewing images. Additionally, or alternatively, labelling suppressed objects in video data may aid seizure-prone persons in identifying bright objects that have been suppressed to decrease a risk of seizures. The system may label objects using text, lines, symbols, or any combination thereof.

The system may receive visible media data and process the data prior to outputting the data for display by a screen. This may allow the system to suppress or completely eliminate one or more potentially harmful characteristics of the data before a user views the video and/or image content provided by the data. The text labels may assist a user in identifying one or more objects on the screen.

Figure 1:
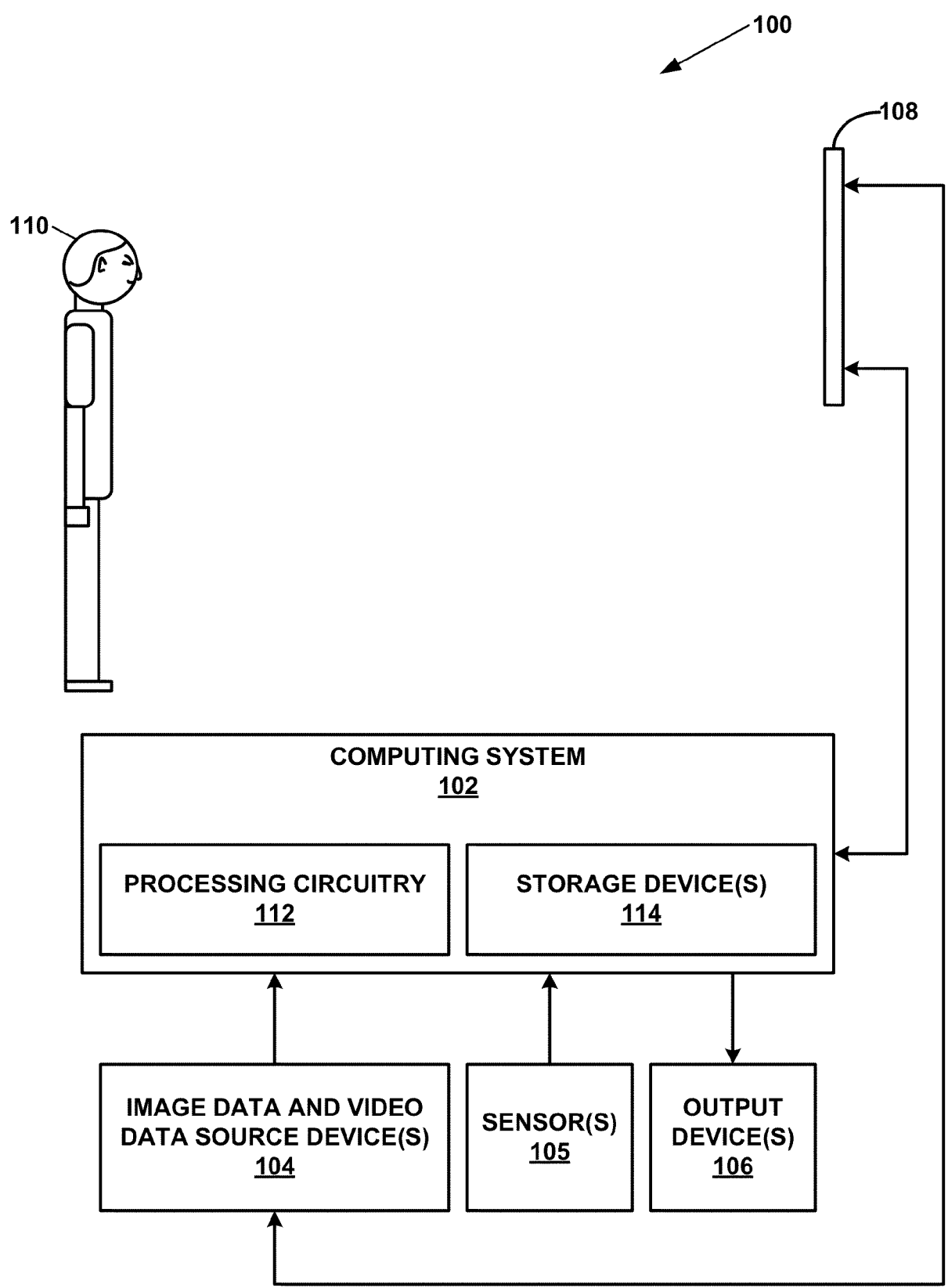
FIG. 1 is a block diagram illustrating an example system, in accordance with one or more aspects of this disclosure.

FIG. 1 is a block diagram illustrating an example system 100, in accordance with one or more aspects of this disclosure. In the example of FIG. 1, system 100 includes a computing system 102, source device(s) 104, sensor(s) 105, one or more output devices 106, and a display device 108. As seen in FIG. 1, computing system 102 may be connected between source device(s) 104 and display device 108. In some examples, the computing system may be included in the display device 108, but this is not required. The computing system 102 may be located within a device separate from display device 108. This may allow computing system 102 to receive visible media data intended for display by device 108, modify the data, and output the modified data for display by device 108.

When display device 108 displays visible media data (e.g., image data or video data), user 110 may perceive the data as images and/or videos on a screen of display device 108. In some examples, sensor(s) 105 may generate data indicative of an environment in which user 110 views video data displayed by display device 108 and output the data to computing system 102. For example, sensor(s) 105 may include an ambient light sensor that generates information indicative of an ambient light level. The ambient light sensor may, in some examples, be a part of display device 108, but this is not required. The ambient light sensor may be located separately from display device 108. Output device(s) 106 may receive information from computing system 102. Display device 108 may display video data and communicate with computing system 102.

In some examples, computing system 102 may be connected to display device 108 via one or more wired connections (e.g., high-definition multimedia interface (HDMI) connections, digital visual interface (DVI) connections, and video graphics array (VGA) connections). In some examples, computing system 102 may be connected to display device 108 via one or more wireless connections. In some examples, computing system 102 may be connected to source device(s) 104 via one or more wired connections. In some examples, computing system 102 may be connected to source device(s) 104 via one or more wireless connections.

Computing system 102 may include processing circuitry 112. Processing circuitry 112 may include one or more microprocessors, application-specific integrated circuits (ASICs), field-programmable gate arrays (FPGAs), or other types of processing circuits. Processing circuitry 112 may be distributed among one or more devices of computing system 102. The devices of computing system 102 may include laptop computers, desktop computers, mobile devices (e.g., mobile phones or tablets), server computers, or other types of devices. One or more of the devices of computing system 102 may be local or remote from user 110. In some examples, one or more devices of computing system 102 may include source device(s) 104 and/or output device(s) 106. This disclosure may describe processing tasks performed by processing circuitry 112 as being performed by computing system 102.

Computing system 102 may include one or more storage devices 114. Storage device(s) 114 may store data. Storage device(s) 114 may include volatile memory and may therefore not retain stored contents if powered off. Examples of volatile memories may include random access memories (RAM), dynamic random access memories (DRAM), static random access memories (SRAM), and other forms of volatile memories known in the art. Storage device(s) 114 may include non-volatile memory for long-term storage of information and may retain information after power on/off cycles. Examples of non-volatile memory may include flash memories or forms of electrically programmable memories (EPROM) or electrically erasable and programmable (EEPROM) memories. Storage device(s) 114 may store instructions executed by processing circuitry 112.

Source device(s) 104 may include any one or combination of devices configured to output visible media. In some examples, source device(s) 104 may include a Wi-Fi™ router connected to the internet and configured to supply streaming video content to display device 108. In some examples, source device(s) 104 may include any one or combination of desktop computers, laptop computers, smart phones, smart watches, tablets, and video game consoles.

Sensor(s) 105 may generate data indicative of an environment in which user 110 views video data displayed by display device 108. For example, sensor(s) 105 may include an ambient light sensor that detects a level of ambient light in the environment in which user 110 views display device 108. Additionally, or alternatively, the sensor(s) 105 may include temperature sensors, motion sensors, image capture devices, or any combination thereof.

Computing system 102 may cause one or more of output devices 106 to perform one or more actions based on parameters identified in visible media data. For example, output devices 106 may include a security system. Computing system 102 may cause the security system to output an alarm that one or more potentially harmful trigger content types are present in visible media processed by computing system 102. Other examples of output devices 106 may include audio devices (e.g., speakers, headphones, earphones, etc.), smart devices (e.g., smart phones, smart watches), lighting devices, or any combination thereof.

Display device 108 may comprise a device that includes a screen for displaying visible media data. In some examples, display device 108 may comprise a television, a computer monitor, a smart phone, or any other device configured to display visible media data. In some examples, display device 108 may include a button or keypad, lights, a speaker for voice commands, a display, such as a liquid crystal (LCD), light-emitting diode (LED), or organic light-emitting diode (OLED). In some examples, the display may be or comprise a touch screen. Display device 108 may be configured to display visible media data such as image data and video data. For example, display device 108 may show an image by displaying a single image frame. Additionally, or alternatively, display device 108 may play a video by displaying a sequence of image frames in order. Display device 108 may also receive user input. The input may be, for example, in the form of pressing a button on a keypad or selecting an icon from a touch screen.

In some examples, display device 108 may communicate with computing system 102. Display device 108 may send video data that display device 108 displays on a screen for analysis by computing system 102. For example, display device 108 may receive video streaming data via a network such as the Internet and display the video streaming data. In this example, display device 108 may send the video streaming data to computing system 102 for analysis in real-time. Processing circuitry 112 may analyze video data received from display device 108 and perform one or more actions based on the analysis.

Computing system 102 may receive visible media data from source device(s) 104. Image data may include a single image frame comprising a pixel array. Each pixel in the pixel array may include one or more pixel parameter values. For example, a pixel may include color values that define a color of the pixel and a luminance of the pixel. Groups of pixels may form objects in the image frame. These groups of pixels, may, in some examples, have similar pixel parameters. Video data may include a sequence of image frames each comprising a respective pixel array. When a device (e.g., display device 108) displays the sequence of image frames in order on a screen, a user may perceive a video on the screen. Computing system 102 may process visible media data received from source device(s) 104 before display device 108 displays the data in order to provide benefits to users that have specific medical conditions (e.g., seizure-prone persons and colorblind persons).

Certain "trigger content types" may increase a risk that seizure-prone persons will suffer harm when viewing images or videos. Trigger content types may include objects that are bright, flashing, fast-moving, or any combination thereof. For example, bright, flashing, fast-moving objects may cause a seizure-prone person to develop a seizure. Another trigger content type that may potentially harm seizure-prone persons include bright objects or lights that appear suddenly in a video for a short period of time (e.g., explosions, lightning flashes, doors opening to a bright room). In some examples, before computing system 102 outputs visible media data to display device 108, computing system 102 may process the visible media data in order to determine whether the data includes regions belonging to any of the trigger content types that potentially harm seizure-prone persons.

Other trigger content types may cause colorblind users to experience difficulty in viewing image data. For example, areas of contrasting colors in an image may represent a trigger content type, because colorblind users may not be able to perceive contrasting colors. For example, an area of contrasting colors may include an object of a color that is different from the color of areas surrounding the object. In some examples, before computing system 102 outputs visible media data to display device 108, computing system 102 may process the visible media data in order to determine whether one or more regions of the data include areas of contrasting color.

In some examples, computing system 102 may process visible media data to identify, in the data, one or more objects of "significant luminance." In some examples, objects of significant luminance may be referred to herein as "bright objects." Objects of significant luminance may include objects that have considerably (e.g., 30%, 40%, or 50%) greater than a baseline luminance value. Regions of the visible media data that include objects of significant luminance may belong to a trigger content type that may potentially provoke a seizure in a seizure-prone person. In one example, the baseline luminance value may include an average luminance or a median luminance of areas proximate to the object. In another example, the baseline luminance value may include an average luminance or a median luminance of the entire image frame. In any case, computing system 102 may compare the luminance of the object with the baseline luminance value to determine whether the luminance of the object is significant.

Computing system 102 may, in one example, identify one or more blinking or flashing objects in video data. Regions of the visible media data that include blinking or flashing objects may belong to a trigger content type that may potentially provoke a seizure in a seizure-prone person. In another example, computing system 102 may identify one or more objects in video data that move across a screen with high velocity. Regions of the visible media data that include fast-moving objects may belong to a trigger content type that may potentially provoke a seizure in a seizure-prone person.

In some examples, computing system 102 may modify identified regions of the visible media data that belong to one or more trigger content types by altering pixel parameters of these regions in order to decrease a luminance of pixels in the identified regions. Additionally, or alternatively, computing system 102 may overlay descriptive text labels on the visible media data proximate to identified regions. For example, an altered image frame may display the term "flashing" near a flashing object and altered image frame may display the term "bright object movement" near a bright, flying object.

Computing system 102 may process visible media data to determine a luminance value associated with each pixel. For example, each pixel may be associated with a set of color values. Computing system 102 may be configured to calculate a luminance value of the pixel based on the set of color values associated with the pixel. Computing system 102 may be configured to calculate a baseline luminance (e.g., an average luminance or median luminance) for an image frame based on the luminance value corresponding to each pixel in the image frame. Computing system 102 may be configured to calculate a baseline luminance for a region within a video frame based on the luminance value corresponding to each pixel in the region. Computing system 102 may compare a baseline luminance of a region of an image frame with the baseline luminance for the entire image frame in order to determine whether the region includes a bright object that belongs to a trigger content type. For example, if the baseline luminance of a region is more than a threshold amount greater than the baseline luminance for the entire image frame, computing system 102 may determine that the region of the image frame belongs to the trigger content type.

Additionally, or alternatively, computing system 102 may process video data to determine whether a region of the visual media data includes a flashing object. To determine whether a region includes a flashing object, computing system 102 may identify, based on luminance values of the pixels in the region, whether a luminance of the region rises and falls over several image frames of the video data. In some examples, computing system 102 identify a "cycle" in the luminance of the region. For example, computing system 102 may determine that the luminance of the region oscillates between a maximum luminance and a minimum luminance, indicating that the region includes a flashing object.

Each pixel in an image frame may be associated with one or more location parameters. These location parameters may include coordinate values that identify a location of the respective pixel on the image frame. To identify moving objects, computing system 102 may detect one or more groups of pixels that travel more than a threshold number of pixels in a threshold amount of time. Computing system 102 may also identify bright objects by detecting areas of contrasting luminance. For example, computing system 102 may detect adjacent contiguous areas that are on opposite sides of the average luminance for a frame of the video data.

Computing system 102 may modify a region of an image frame that belongs to a trigger content type. For example, computing system 102 may suppress bright objects according to user-selected settings in order to improve the user viewing experience. For example, computing system 102 may suppress a luminance of regions including bright objects so that the luminance of these regions is no greater than a maximum luminance level. In some examples, the maximum luminance level may represent a percentage (e.g., 120%, 130%, or 140%) of the baseline luminance value for an image frame, where the percentage is selected by the user. To suppress the luminance of a region, computing system 102 may decrease, to the maximum luminance level, a luminance of each pixel that is greater than the maximum luminance level. Consequently, bright objects in the suppressed regions may still be brighter than the baseline luminance for the image frame, but the luminance of the region may be limited to a nonthreatening level.

Baseline luminance (e.g., average luminance or median luminance) of image frames in video data may change significantly in a short amount of time. For example, during a movie explosion, the baseline luminance of frames in which the explosion is occurring may increase significantly as compared with frames prior and subsequent to the explosion. Computing system 102 may suppress a luminance of frames in which the explosion is occurring based on a baseline luminance of one or more frames preceding the explosion.

In some examples, computing system 102 will suppress and/or label only types of objects the user selects or that another person selects for the user. For example, the user may select only flashing objects, moving objects, significantly bright objects, bright moving objects, bright flashing objects, or all bright objects. Consequently, computing system 102 may allow the user or other person to design custom settings based on the medical needs and personal preferences of the user.

Computing system 102 may also detect ambient light in an area in which the user is viewing the video data and adjust a luminance of the video data based on the detected ambient light. For example, computing system 102 may increase the luminance of detected bright objects in more lighted viewing areas and decrease the luminance of detected bright objects in less lighted viewing areas.

Furthermore, computing system 102 may analyze video color information. For example, computing system 102 may analyze color information corresponding to objects in the video data by correlating the color information with standard color spectrum chart data. Computing system 102 may identify colors in red, green, and blue (RGB), cyan, magenta, yellow, and key (CMYK), or custom color modes. Computing system 102 may use color analysis in conjunction with the techniques described herein for identifying flashing and bright objects. For example, when computing system 102 detects that a flashing object is red, computing system 102 may label the object as a "red flashing object," and when computing system 102 detects that a bright moving object is orange, computing system 102 may label the object as an "orange streak of light." Additionally, or alternatively, computing system 102 may identify the colors involved in contrasting contiguous areas.

Although FIG. 1 illustrates display device 108 as a flat screen displaced from user 110, techniques of this disclosure are not meant to be limited to flat screens displaced from the viewer. Display device 108 may comprise any device that is capable of displaying visible media data. Example display devices include televisions, computer monitors, tablet computers, smart phones, vehicle dashboard screens, smart watches, virtual reality (VR) headsets, mixed reality (MR) headsets, and augmented reality (AR) headsets.

In some examples, VR headsets may completely replace a user's environment with a virtual environment. MR headsets may merge a user's environment with a virtual environment. For example, an MR headset may alter an appearance of a real object in the user's environment with virtual aspects. AR headsets may add one or more virtual features to a user's environment.

In some examples, computing system 102 may be integrated into a VR headset, an MR headset, or an AR headset in order to pre-process content for display by the headset. VR, MR, and AR headsets may generate content for display by the headset so that a user wearing the headset perceives a three-dimensional (3D) environment that may include virtual content, real content, or a combination of both virtual content and real content. In some examples, "real" content depicts real things in a user's environment. For example, real content may include furniture, objects, and people that are located in a room that the user is occupying. In some examples, "virtual" content includes objects that are not located in the user's environments. Virtual content may include video game characters, fictional settings, and fictional objects.

Both real content and virtual content may include one or more trigger content types that are potentially harmful to seizure-prone persons. Computing system 102 may process both real content and virtual content generated by a headset in order to identify one or more regions that belong to a trigger content type. For example, computing system 102 may identify one or more regions that include objects that have significant luminance, are flashing, or are moving. Computing system 102 may, in some examples, suppress one or more identified regions. In some examples, computing system 102 may generate one or more labels for overlay onto the real and/or virtual content in order to describe characteristics of the identified regions.

Computing system 102 may, in some examples, process content for display by a headset in real time, so that an impaired user of a VR, MR, and AR headset may experience content at nearly the same time that non-impaired users experience the same content. In other words, computing system 102 may process the content so that a processing delay is less than a few microseconds (μs). This means that any processing delay will be short enough to go unnoticed by the impaired user. The system will impose all the changes to the base video and the character generation on the glasses. Normal viewing will still take place for other individuals. Standard alignment of screen data will take place in the same manner as it would for other AR systems. Looking at the screen will allow the headset to electronically align the pixels proportionately.

In some examples, user 110 may have a medical condition that can develop or worsen when user 110 views videos or images on a screen. For example, seizure-prone persons may develop a seizure in response to viewing video data that includes bright objects, flashing objects, sudden bright flashes (e.g., explosions), or any combination thereof. A risk of developing a seizure may be correlated with a quantity of bright objects on the screen, a size of bright objects, a luminance of bright objects on the screen, a sudden appearance of bright objects, bright objects flashing on and off, bright objects moving, or any combination thereof. Computing system 102 may be configured to process video data in order to identify and/or suppress one or more regions that include objects (e.g., bright objects, moving objects, and/or flashing objects) in video data that are potentially harmful to seizure-prone persons. Additionally, or alternatively, computing system 102 may output one or more warnings indicating an increased risk of developing a seizure.

Some medical conditions may decrease an ability of user 110 to perceive aspects of video data. For example, colorblind persons might not be able to perceive areas of contrasting color in an image. "Areas of contrasting color" may refer to locations on an image that include two or more colors, where boundaries exist between the two or more colors. For example, an image may include an area of contrasting color comprising a bright red object that is surrounded by a background of a different color. A colorblind person might not be able to perceive the difference in color between the bright red object and the background. Computing system 102 may identify one or more regions including areas of contrasting color in image data. Computing system 102 may be configured to generate descriptive content for these areas of contrasting color. For example, the descriptive content may include text labels that describe a color of one or more areas of visible media data. The descriptive content may include indicators (e.g., arrows, lines, shapes) that identify one or more areas of an image and connect text labels with these areas. Computing system 102 may overlay the descriptive content on the visible media data and output the visible media data for display by display device 108. User 110 may be able to identify one or more areas of contrasting color in the image based on the descriptive content (e.g., text labels and indicators) overlaid on the image.

By processing and modifying video data before displaying the data on a screen, computing system 102 may increase a likelihood that user 110 can safely view the video data as compared with systems that do not process video data prior to user consumption.

As described herein, the term "image frame" may refer to a plurality of pixels that form a pixel array. The pixel array may comprise a two-dimensional (2D) matrix of pixels, each pixel being associated with one or more pixel parameters. An image frame may comprise a single image including one or more objects. Video data may comprise a "sequence of image frames" played in order. In some examples, parameters of the pixels may change as the video data progresses through the sequence of image frames. "Visual media data" may refer to video data comprising a sequence of image frames and/or image data comprising a single image frame.

Figure 2:
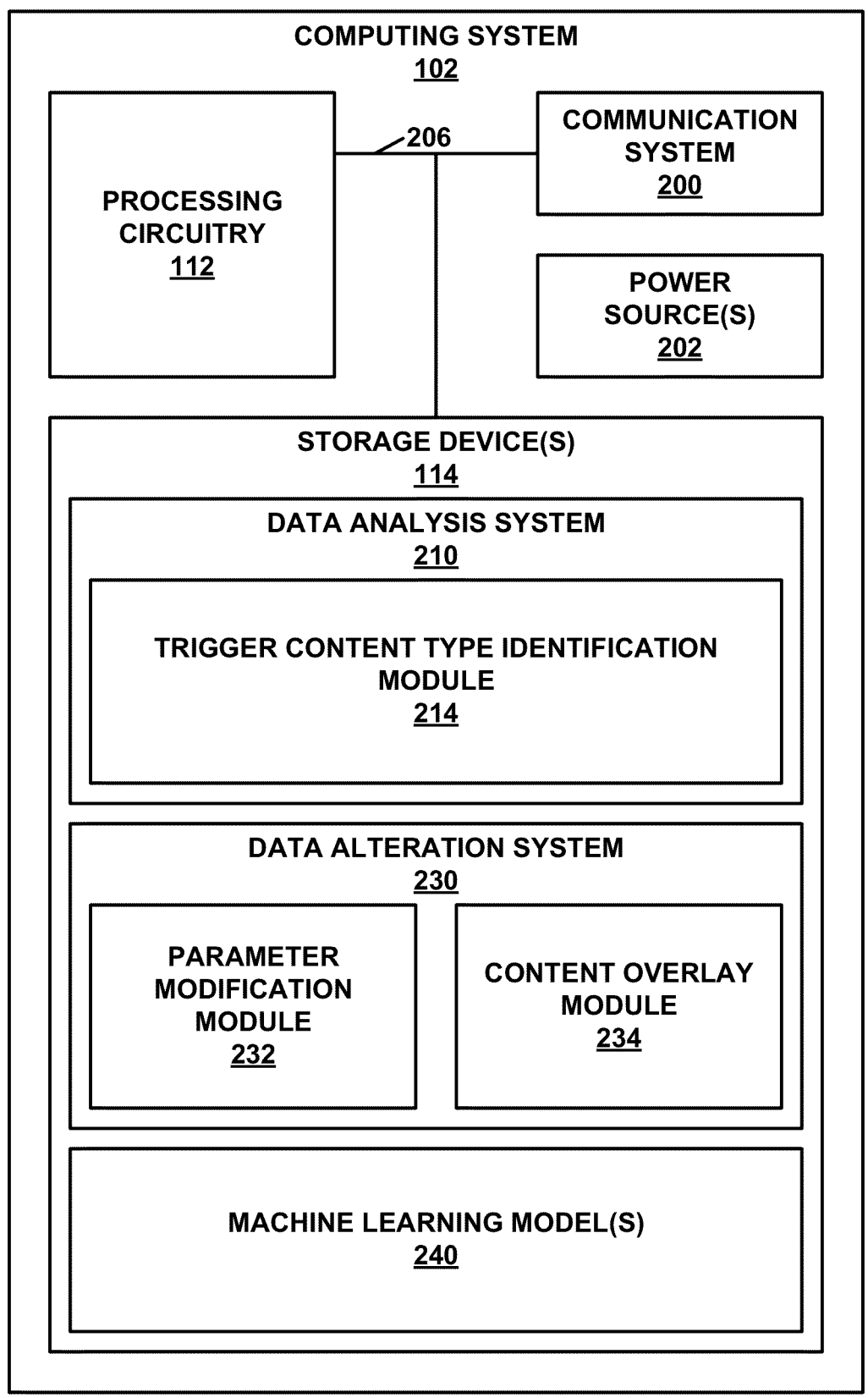
FIG. 2 is a block diagram illustrating example components of the computing system of FIG. 1, in accordance with one or more aspects of this disclosure.

FIG. 2 is a block diagram illustrating example components of computing system 102, in accordance with one or more aspects of this disclosure. In the example of FIG. 2, computing system 102 includes processing circuitry 112, one or more storage devices 114, a communication system 200, and one or more power sources 202. Storage device(s) 114 may store information required for use during operation of computing system 102. Power source(s) 202 may provide electrical energy to processing circuitry 112, storage device(s) 114, and communication system 200. Communication channel(s) 206 may interconnect components of computing system 102 for inter-component communications (physically, communicatively, and/or operatively). In some examples, communication channel(s) 206 may include a system bus, a network connection, an inter-process communication data structure, or any other method for communicating data.

Processing circuitry 112 comprises circuitry configured to perform processing functions. For instance, processing circuitry 112 may include one or more microprocessors, ASICs, FPGAs, or other types of processing circuits. Processing circuitry 112 may include programmable and/or fixed-function circuitry. In some examples, processing circuitry 112 may read and may execute instructions stored by storage device(s) 114.

Storage device(s) 114 may store data. In some examples, storage device(s) 114 may include volatile memory and may therefore not retain stored contents if powered off. Examples of volatile memories may include RAM, DRAM, SRAM, and other forms of volatile memories known in the art. In some examples, storage device(s) 114 may include non-volatile memory for long-term storage of information and may retain information after power on/off cycles. Examples of non-volatile memory may include flash memories or forms of EPROM or EEPROM memories. In the example of FIG. 2, storage device(s) 114 are configured to store a data analysis system 210, a data alteration system 230, and one or more machine learning models 240.

Communication system 200 may enable computing system 102 to send data to and receive data from one or more other devices, such as source device(s) 104, output device(s) 106, display device 108, and so on. Communication system 200 may include radio frequency transceivers, or other types of devices that are able to send and receive information. In some examples, communication system 200 may include one or more network interface cards or other devices for cable-based communication.

Computing system 102 may receive video data via communication system 200. In some examples, the video data comprises a sequence of image frames that, when displayed according to the sequence, form a video. In some examples, the video data may comprise a single image frame or a set of image frames that do not form a video. In some examples, the video data may comprise audio data and/or other kinds of video data.

Computing system 102 receives video data from source device(s) 104 comprising video data for display by device 108. In some examples, computing system 102 may receive the video data and process the video data in real time or near-real time as device 108 displays the video data. In some examples, computing system 102 may receive the video data and process the video data before device 108 begins displaying the video data. In some examples, computing system 102 may output audio data alerting user 110 to the presence of objects in the video data. Device 108 or another device (e.g., one of output devices 106) may present this audio data.

In some examples, data analysis system 210 is configured to process a sequence of image frames in order to detect one or more characteristics of the sequence of image frames. For example, trigger content type identification module 214 may be configured to identify, in one image frame of the sequence of image frames, a region of interest for analysis. Each image frame of the sequence of image frames may comprise a plurality of pixels that form a pixel array. The pixel array may include a number of pixel columns and a number of pixel rows. For example, 1080 p video data may comprise 1920 pixel columns and 1080 pixel rows, and 720 p video data may comprise 1280 pixel columns and 720 pixel rows. To identify the region of interest for analysis, trigger content type identification module 214 may identify a group of pixels that define the region in an image frame.

In some examples, each pixel of an image frame may be associated with one or more parameter values. For example, a pixel may include one or more color values. In some examples, the one or more color values for each pixel include a red (R) color value, a green (G) color value, and a blue (B) color value. This may be referred to as the "RGB" color model. Together, the three RGB parameter values may dictate the color of the pixel. In some examples, the one or more color values for each pixel include a cyan (C) color value, a magenta (M) color value, a yellow (Y) color value, and a key (K) color value. This may be referred to as the "CMYK" color model. Together, the three CMYK parameter values may determine the color of the pixel.

In some examples, trigger content type identification module 214 may determine a luminance value for a pixel based on the one or more color values associated with the pixel. Humans may perceive a luminance of each color component differently. For example, in the RGB color model, humans may be more sensitive to green light than red light, and humans may be more sensitive to red light than blue light. In this example, trigger content type identification module 214 may calculate a luminance value for a pixel based on the three RGB parameter values for the pixel, where the G color value is weighted more than the R color value and the R color value is weighted more than the B color value. In some examples, trigger content type identification module 214 may calculate a luminance value for each pixel video data received via communication system 200. In some examples, the video data may include luminance values for each pixel when computing system 102 receives the video data.

Trigger content type identification module 214 may, in some cases, identify a region in an image frame that belongs to a trigger content type potentially harmful to a seizure-prone person. For example, trigger content type identification module 214 may identify, within an image frame, a group of pixels having a greater luminance than one or more other regions of the image frame. For example, trigger content type identification module 214 may analyze the pixels of an image frame in order to detect a minimum luminance value for the pixel array and a maximum luminance value for the pixel array. In some examples, trigger content type identification module 214 may calculate a baseline luminance value for the pixel array. In some examples, the baseline luminance value represents a mean luminance value of the pixels in the image frame. In some examples, the baseline luminance value represents a median luminance value of the pixels in the image frame. In some examples, to identify the group of pixels, trigger content type identification module 214 may be configured to identify a group of pixels each having a luminance value that is greater than the baseline luminance value, where areas surrounding the group of pixels have lower luminance values than the identified group of pixels.

In some examples, trigger content type identification module 214 may identify one or more areas of contrasting luminance. For example, trigger content type identification module 214 may identify one or more groups of pixels. Area identification module may calculate a mean luminance or a median luminance of each group of pixels, and determine whether any adjacent groups of pixels have contrasting luminance. For example, trigger content type identification module 214 may determine whether a difference between a luminance of a first group of pixels and a luminance of a second group of pixels proximate to the first group of pixels is more than a threshold luminance difference value. When the difference between the luminance of proximate groups of pixels is greater than the threshold, the trigger content type identification module 214 may determine that the groups of pixels represent an area of contrasting luminance. Detecting areas of contrasting luminance may be beneficial for use in analyzing medical images such as x-rays and other body scans.

Trigger content type identification module 214 may, in some cases, identify an area of contrasting colors in visible media data. For example, trigger content type identification module 214 may identify a group of pixels in an image frame that have color values different from color values of pixels proximate to the group of pixels. In some examples, trigger content type identification module 214 may identify certain color contrasts that are known to not be perceivable by color blind persons, but this is not required. Trigger content type identification module 214 may identify any areas of contrasting colors.

When trigger content type identification module 214 identifies the area in the image frame, trigger content type identification module 214 may track the identified area through a sequence of image frames. Trigger content type identification module 214 may detect one or more characteristics of the area in the image frame. For example, trigger content type identification module 214 may identify a location of the group of pixels within the pixel array, color values for each pixel of the group of pixels, luminance values for each pixel of the group of pixels, a size of the group of pixels, or any combination thereof.

In examples where the video data comprises a sequence of image frames, trigger content type identification module 214 may track an identified group of pixels through the sequence of image frames. For example, when trigger content type identification module 214 identifies a group of pixels in a first image frame, trigger content type identification module 214 may determine one of more characteristics of the group of pixels based on pixel parameters corresponding to the group of pixels. Trigger content type identification module 214 may determine the characteristics of the group of pixels in each subsequent image frame of the video data. Sometimes, the group of pixels are moving, meaning that the group of pixels illustrate an object that travels across the screen as the video data progresses through the sequence of image frames. Trigger content type identification module 214 may track a moving object by determining that a location of the group of pixels is changing as the video data progresses through the sequence of image frames, and determining one or more characteristics of the group of pixels in each image frame of the sequence of image frames in which the group of pixels appears.

Characteristics of the identified group of pixels may change as the video progresses through the sequence of image frames. For example, the group of pixels may depict a moving object, and the group of pixels may move across the pixel array as the image frames progress through the sequence. In some examples, a color of the group of pixels may change across the sequence of image frames. In some examples, a size of the group of pixels may change across the sequence of image frames. In some examples, a luminance of the group of pixels may change across the sequence of image frames.

Trigger content type identification module 214 may determine one or more characteristics of the identified group of pixels corresponding to each image frame of the sequence of image frames, and track changes in the one or more characteristics through the sequence of image frames. For example, trigger content type identification module 214 may analyze one or more image frames at close intervals to detect one or more pixels having zero luminance (e.g., black pixels) and detect a maximum pixel luminance within the respective image frame. Additionally, or alternatively, trigger content type identification module 214 may determine one or more characteristics of an entire image frame (e.g., a median luminance or a mean luminance of an image frame).

In one example, trigger content type identification module 214 may determine that the group of pixels represents a flashing or blinking object when the luminance of the group of pixels alternates between high luminance levels and low luminance values as the sequence of image frames progresses. For example, trigger content type identification module 214 may detect alternating luminance in a group of pixels, indicating that the group of pixels is flashing or blinking. Trigger content type identification module 214 may calculate a mean luminance or a median luminance of the entire image frame. Trigger content type identification module 214 may calculate a mean luminance or a median luminance of the group of identified pixels. Trigger content type identification module 214 may compare the luminance of the identified group of pixels with the luminance of the entire image frame throughout the sequence of image frames in order to determine whether the one or more pixels have alternating luminance. Additionally, or alternatively, trigger content type identification module 214 may compare the luminance of the identified group of pixels with a maximum luminance that the screen is capable of outputting through the sequence of image frames. Repeated cycles of rises and falls in the luminance of the group of pixels may indicate that the group of pixels is a flashing or blinking object.

In another example, trigger content type identification module 214 may determine that the group of pixels represents a moving object when the group of pixels moves across the pixel array as the sequence of image frames progresses. Since fast-moving objects may be more likely to induce a seizure than slow-moving objects, trigger content type identification module 214 may determine a speed of a moving object. In some examples, to determine whether a group of pixels represents a fast-moving object, trigger content type identification module 214 may determine whether the group of pixels travels more than a threshold number of pixels within a threshold amount of time (e.g., more than 500 pixels in 200 milliseconds (ms)). The threshold amount of time may depend on a frequency of the sequence of frames. The threshold number of pixels may depend on a pixel resolution of the image frames.

Trigger content type identification module 214 may additionally or alternatively determine a luminance of a group of pixels identified as a fast-moving object and may determine whether the group of pixels have alternating luminance. When trigger content type identification module 214 determines that the group of pixels identified as a fast-moving object have a high luminance value or have alternating luminance, computing system 102 may determine that the group of pixels is more likely to induce a seizure than a fast-moving group of pixels that are not high in luminance.

In another example, trigger content type identification module 214 may determine that the group of pixels represents a sudden event (e.g., an explosion or a flash of light) if the group of pixels comprise high luminance values and the group of pixels increases in size as the sequence of image frames progresses. Additionally, or alternatively, trigger content type identification module 214 may determine that the group of pixels represents a sudden event when an average luminance of the image frames or a mean luminance of the image frames changes suddenly as the sequence of image frames progresses.

In some examples, trigger content type identification module 214 may execute a machine learning model of machine learning model(s) 240 in order to identify the one or more characteristics of the identified group of pixels. For example, the machine learning model may receive the sequence of image frames as an input and may output the one or more characteristics of the identified group of pixels. In some examples, the machine learning model may be trained using a set of training data. The set of training data may include video datasets associated with known characteristics.

Data alteration system 230 may be configured to perform, based on the one or more characteristics of the video data received by computing system 102, one or more actions. In some examples, data alteration system 230 may perform the one or more actions in real time or near-real time as computing system 102 receives the video data. For example, the video data may comprise video data including a sequence of image frames, and data alteration system 230 may perform actions in real time as each image frame of the sequence of image frames arrives at computing system 102. In some examples, data alteration system 230 may perform the one or more actions when computing system 102 receives the entire video data. In some examples, data alteration system 230 may execute a machine learning model of machine learning model(s) 240 in order to perform actions, but this is not required. Data alteration system 230 may execute one or more other models or algorithms in order to perform actions.

Parameter modification module 232 may be configured to alter one or more intrinsic parameters of the video data. In one example, parameter modification module 232 may be configured to alter one or more color values of the video data. In another example, parameter modification module 232 may be configured to alter one or more luminance values of the video data. In a color image, parameter modification module 232 may be configured to alter a luminance of one or more pixels by altering one or more color values. In a greyscale image, parameter modification module 232 may be configured to alter a luminance of one or more pixels by altering a brightness parameter value.

In some examples, viewing images or videos may increase a risk that a seizure-prone person will develop a seizure. For example, objects that are bright, flashing, moving, or rapidly changing may cause a seizure-prone person to develop a seizure. Consequently, it may be beneficial for parameter modification module 232 to alter one or more parameters of video data in order to decrease a likelihood that an object in video data will cause a seizure-prone person to develop a seizure.

As described above, trigger content type identification module 214 may identify one or more groups of pixels in video data that are potentially harmful to seizure-prone persons. Parameter modification module 232 may alter one or more parameters of the identified one or more groups of pixels in order to decrease a likelihood that these pixel groups will induce a seizure. As an example, parameter modification module 232 may decrease a luminance of one or more pixels that are greater than a threshold luminance level. Parameter modification module 232 may change one or more color values of a pixel in order to decrease a luminance of the pixel. In some examples, parameter modification module 232 may calculate the threshold luminance value based on a baseline luminance value (e.g., a mean luminance value or a median luminance value for the image frame). For example, computing system 102 may set the threshold luminance value for an image frame to be a percentage (e.g., 10%, 20%, or 30%) greater than a mean luminance value for the image frame. In some examples, the threshold luminance value may be user-selectable based on a perceived sensitivity of user 110 to luminance.

In some examples, trigger content type identification module 214 may analyze video data in order to detect significant changes in average luminance across a sequence of image frames, and parameter modification module 232 may alter the video data to mitigate these changes in luminance. For example, if a mean luminance of an image frame is significantly (e.g., 30%, 40%, or 50%) brighter than a previous image frame, parameter modification module 232 may attenuate a luminance of the brighter image frame to match a luminance of one or more previous frames. This may allow parameter modification module 232 to attenuate bright lights that engulf the pixel array (e.g., flashes and explosions).

Parameter modification module 232 may alter parameters of an identified group of pixels in order to suppress characteristics that may be harmful to a seizure-prone person. For example, parameter modification module 232 may suppress a luminance of groups of pixels that are, fast-moving, blinking, flashing, or any combination thereof. In some examples, computing system 102 may receive one or more user inputs indicating kinds of objects that user 110 is sensitive to. For example, the user input may indicate that user 110 is more sensitive to bright flashing objects than bright moving objects. In this example, parameter modification module 232 may suppress a luminance of bright flashing objects without suppressing a luminance of bright moving objects, or suppress a luminance of bright flashing objects to a greater degree than parameter modification module 232 suppresses a luminance of bright moving objects.

Computing system 102 may be configured to receive, via communication system 200, information indicative of a level of ambient light in an area in which user 110 views display device 108. In some examples, display device 108 may include an ambient light sensor that generates the information indicative of the level of ambient light. In some examples, the ambient light sensor may be separate from display device 108. Parameter modification module 232 may alter one or more parameters of image frames based on the level of ambient light within the area in which user 110 views display device 108. For example, parameter modification module 232 may decrease luminance of video data when there is a lower amount of ambient light, and increase luminance of video data when there is a greater amount of ambient light. Altering a luminance of video data might not affect the primary screen brightness of the display device 108.

Content overlay module 234 may be configured to generate content to overlay on the video data. In one example, content overlay module 234 may generate text describing one or more characteristics of the video data identified by the trigger content type identification module 214. Additionally, or alternatively, content overlay module 234 may identify one or more symbols, shapes or graphics that identify a region of an image frame. In some examples, the one or more symbols, shapes or graphics that identify a region of an image frame may link a region of an image frame to text describing the region of the image frame.

In some examples, content overlay module 234 may execute a machine learning model of machine learning model(s) 240 in order to generate content to overlay on the video data. The machine learning model may increase an accuracy of text labels and symbols in describing an object as compared with systems that generate content without using a machine learning model. For example, computing system 102 may train the machine learning model based on a set of training data, where the set of training data includes a plurality of sets of image or video data, each set of data including one or more objects having known characteristics. Since computing system 102 trains the machine learning model based on known associations between objects and characteristics, the machine learning model may be configured to accurately output content describing a present object in present video data.

Since computing system 102 may, in some cases, suppress one or more characteristics of objects in video data to prevent user 110 from developing a seizure, these suppressed objects may be more difficult for user 110 to perceive on display device 108. Consequently, it may be beneficial for content overlay module 234 to generate content describing the characteristics of the suppressed objects, so that user 110 can perceive these suppressed characteristics without experiencing negative effects from the suppressed characteristics. For example, when trigger content type identification module 214 identifies a group of pixels representing a bright, fast-moving object, content overlay module 234 may generate a text label that identifies the object as "bright" and "fast-moving." Example text labels may include "bright object movement," "fast-moving bright object," or other similar labels. Content overlay module 234 may place the content describing the object on the image frame on a location of the frame proximate to the object. When the object moves across the pixel array through the sequence of image frames, content overlay module 234 may cause the content to move with the object so that the content remains proximate to the object.

In some examples, content overlay module 234 may execute one or more character generation algorithms in order to generate content that gives context to one the one or more regions identified and tracked by trigger content type identification module 214. In some examples, when content overlay module 234 generates content by executing machine learning model(s), content overlay module 234 that describes objects more accurately than systems that generate content without executing machine learning models. Computing system 102 may cause display device 108 to display content generated by content overlay module 234 for a duration of a video or for a full video.

Content overlay module 234 may generate content indicating a color of one or more regions of an image frame. As described above, trigger content type identification module 214 may identify color values for each pixel of a pixel array. These color values may include RGB color values or CMYK color values. Based on the color values for a group of pixels, content overlay module 234 may generate content indicating a color of a group of pixels on a pixel array. In one example, content overlay module 234 may generate text indicating that a group of pixels correspond to a "red" object when the color values of the group of pixels indicate that a substantial percentage of the group of pixels are red. In another example, content overlay module 234 may generate text indicating that a group of pixels correspond to an "orange" object when the color values of the group of pixels indicate that a substantial percentage of the group of pixels are orange.

Content overlay module 234 may generate content describing any one or combination of a set of characteristics identified by trigger content type identification module 214. For example, trigger content type identification module 214 may identify color characteristics for a group of pixels, luminance characteristics for a group of pixels (e.g., a maximum luminance and whether the group of pixels represents a flashing object), location characteristics for a group of pixels (e.g., whether the group of pixels are moving and a speed of the group of pixels), size characteristics for a group of pixels, identity characteristics for the group of pixels (e.g., whether the group of pixels represent a car, a person, or another kind of tangible object), or any combination thereof. For example, content overlay module may generate the label "red flashing tower" or "green flashing indicator" to describe an object. A moving object can be identified as an "orange streak of light," for example. Content overlay module 234 may employ natural language processing (NLP) techniques in order to coordinate a flow of descriptive words for an object.

In some examples, content overlay module 234 may generate content describing one or more areas of contrasting colors. For example, content overlay module 234 may generate a first label identifying a first area as an "intense red area" and content overlay module 234 may generate a second label identifying a second area proximate to the first area as a "light brown area." By generating content describing areas of contrasting colors, content overlay module 234 may assist colorblind persons in identifying these areas in an image frame. This may be beneficial for assisting clinicians in analyzing medical images, where areas of contrasting color may be important for diagnosing or treating a medical condition.

In some examples, computing system 102 may receive information indicative of one or more user selections of particular color contrasts. For example, the selected color contrasts may include red/brown color contrasts, green/blue color contrasts, orange/red color contrasts or any other combination of colors. Computing device 102 may process image frames to identify the selected color contrasts, and generate content describing the selected color contrasts. This may be particularly useful in the medical field (e.g., screening for cancers that comprise specific colorings).

In some examples, computing system 102 may output video data to the display device 108 with one or more features that allow user 110 to make selections on the video data. For example, computing system 102 may insert a user interface overlay onto the image frames allowing selectivity of one or more areas of the screen. The user interface overlay may also include freeze, play, fast-forward and rewind controls that allow user 110 to navigate through video data. In some examples, computing system 102 may receive a user selection of an area of an image frame. For example, the display device 108 may include one or more inputs (e.g., buttons) that allow user 110 to make selections on the display device 108. Additionally, or alternatively, the display device 108 may be connected to one or more user input devices (e.g., mouse, keyboard) that allow the user to make selections on display devices 108.

Computing system 102 may determine one or more characteristics of a selected area. Computing system 102 may identify one or more other areas having similar color characteristics. In some examples, computing system 102 may identify one or more areas of color bleed in image data. Color bleed occurs when the color of one object is reflected onto another object in the same image. Computing system 102 may identify one or more areas of color bleed. In some examples, computing system 102 may modify areas of color bleed in order to remove color reflected onto an object.

In some examples, computing system 102 may identify one or more areas that fall within a threshold percentage of the hue, luminance, or size of a selected area. In some examples, computing device 102 may detect one or more areas having similar characteristics using machine learning model(s) 240.

In some examples, machine learning model(s) 240 may include a convolutional neural network (CNN). The CNN may accept an image frame as an input. The CNN may output one or more trigger content types as an output. In some examples, computing system 102 may train the CNN based on user input indicating one or more trigger content types associated with regions of images. For example, a user may indicate one or more bright objects, flashing objects, and moving objects in images, and computing system 102 may save these indications in a training data set. Computing system 102 may train the CNN based on the training data which includes a plurality of image frames and a plurality of associations between objects in the plurality of image frames and respective trigger content types.

The techniques described herein may be beneficial for pre-processing several different kinds of video data. For example, computing system 102 may pre-process security and operations video data in order to assist security personnel in viewing the security and operations video data. For example, security and operations videos may include the types of flashes that may present a risk to seizure-prone persons. Computing system 102 may pre-process the security and operations video data in order to identify objects, and suppress the objects. Additionally, or alternatively, computing system 102 may label the objects in order to label objects so that security personnel can identify the objects even when they are suppressed.

In some examples, computing system 102 may process visual media data based on one or more setup parameters to accommodate its use. These setup parameters may, in some examples, indicate one or more medical conditions that user 110 is experiencing. Computing system 102 may determine which trigger content types to identify in image data based on the setup parameters. For example, a seizure-prone person may not need to know the size of a "green area". Seizure-prone persons may adjust levels of luminance to alter according to their medical history.

Computing system 102 may pre-process medical data in order to help clinicians view medical images and make clinical decisions based on the information in the medical images. For example, medical images may include objects that are evidence of one or more medical conditions present in a patient. It may be important for a clinician to identify these objects and prescribe a treatment program based on these objects. Helping the clinician to identify important objects by labelling areas of contrasting colors may assist the clinician in providing care. Computing system 102 may pre-process training video content in order to help viewers absorb information in the training videos. In another example, computing system 102 may pre-process entertainment video (e.g., streaming content and video game content).

Figure 3:
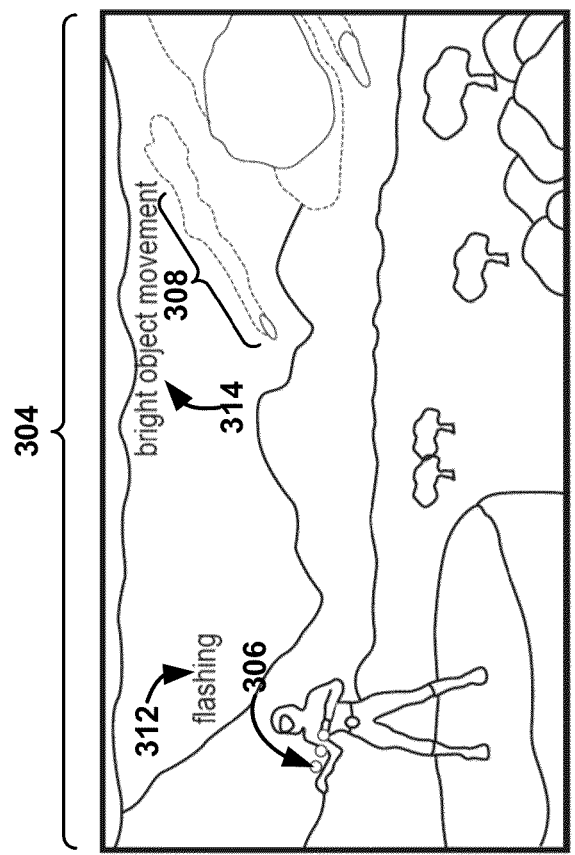
FIG. 3 is a conceptual diagram illustrating an image frame and a modified image frame, in accordance with one or more aspects of this disclosure.
Figure 3:
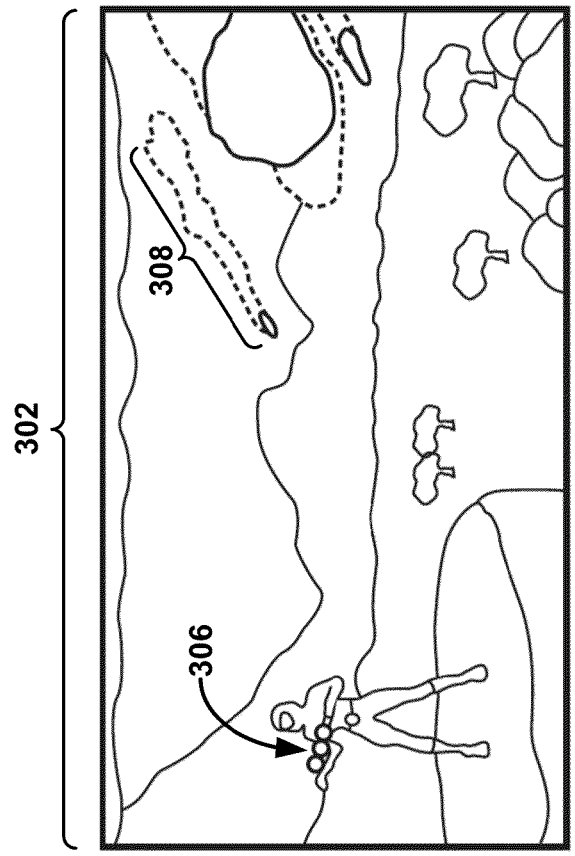

FIG. 3 is a conceptual diagram illustrating an image frame 302 and a modified image frame 304, in accordance with one or more aspects of this disclosure. In some examples, image frame 302 represents a pixel array, where each pixel is associated with one or more parameter values (e.g., color values and luminance values). Trigger content type identification module 214 may process the parameter values associated with each pixel of the pixel array in order to determine one or more characteristics of one or more objects within image frame 302. Based on determining the one or more characteristics, data alteration system 230 may modify image frame 302 in order to generate modified image frame 304.

As seen in FIG. 3, image frame 302 comprises an image of a vista including a humanoid figure holding a bright object 306. Additionally, image frame 302 includes a flying object 308 with a bright tail. In some examples, image frame 302 represents one image frame of video data including a sequence of image frames. One or more objects in image frame 302 may move or change as the video data progresses through the sequence of image frames. For example, when bright object 306 is a flashing object, a luminance of bright object 306 may alternate between high luminance and low luminance as the video data progresses through the sequence of image frames. Furthermore, the flying object 308 may move across the screen as the video data progresses through the sequence of image frames. As seen in FIG. 3, modified image frame 304 also includes bright object 306 and flying object 308, but one or more characteristics of bright object 306 and flying object 308 are different in modified image frame 304.

In some examples, trigger content type identification module 214 may determine one or more characteristics of the bright object 306. For example, trigger content type identification module 214 may identify a group of pixels corresponding to the bright object 306. In some examples, trigger content type identification module 214 may identify the group of pixels in image frame 302, but this is not required. In some examples, trigger content type identification module 214 may identify the group of pixels in an image frame preceding image frame 302 in the video data. Trigger content type identification module 214 may determine a luminance of the bright object 306, and determine that bright object 306 is a flashing object.

Based on determining a luminance of bright object 306, parameter modification module 232 may perform one or more actions. For example, parameter modification module 232 may attenuate a luminance of bright object 306. As seen in the image frame 302 and the modified image frame 304, a luminance of the bright object 306 is lower in modified image frame 304 than a luminance of bright object 306 in the image frame 302. For example, the luminance of bright object 306 may be greater than a threshold luminance value in image frame 302. Data alteration system 230 may decrease a luminance of bright object 306 to a threshold luminance value in order to generate modified image frame 304.

Based on determining that bright object 306 is flashing, parameter modification module 232 may alter one or more parameters of bright object 306 in order to decrease a likelihood that bright object 306 will cause a seizure-prone person to develop a seizure. In another example, parameter modification module 232 may modify the sequence of image frames including image frame 302 so that a luminance of bright object 306 is constant through the sequence of image frames. This may cause bright object 306 to not appear as "flashing" on the display device 108. In another parameter modification module 232 may modify the sequence of image frames including image frame 302 in order to decrease a magnitude of the fluctuation of the luminance of bright object 306 through the sequence of image frames. This may "soften" bright object 306 so that bright object 306 still blinks, but a likelihood that the blinking will induce a seizure is decreased.

Additionally, or alternatively, trigger content type identification module 214 may determine one or more characteristics of flying object 308. For example, trigger content type identification module 214 may identify a group of pixels corresponding to flying object 308. In some examples, trigger content type identification module 214 may identify the group of pixels in image frame 302, but this is not required. In some examples, trigger content type identification module 214 may identify the group of pixels in an image frame preceding image frame 302 in the video data. Trigger content type identification module 214 may determine a luminance of the flying object 308 and determine that flying object 308 is moving.

Based on the luminance of flying object 308, parameter modification module 232 may perform one or more actions. For example, parameter modification module 232 may attenuate the luminance of flying object 308. As seen in image frame 302 and the modified image frame 304, the luminance of flying object 308 is lower in modified image frame 304 than the luminance of flying object 308 in image frame 302. For example, the luminance of a tail of flying object 308 may be greater than a threshold luminance value in image frame 302. Data alteration system 230 may decrease a luminance of flying object 308 to a threshold luminance value in order to generate modified image frame 304.

Content overlay module 234 may generate content describing bright object 306 and flying object 308. For example, content overlay module 234 may generate a text label 312 that includes the "flashing" text to describe bright object 306 based on the trigger content type identification module 214 determining that bright object 306 is flashing. Content overlay module 234 may overlay text label 312 as part of generating modified image frame 304. Additionally, in the example of FIG. 3, content overlay module 234 may generate a text label 314 including the text "bright object movement" to describe flying object 308. Content overlay module 234 may overlay text label 314 as part of generating modified image frame 304.

Figure 4:
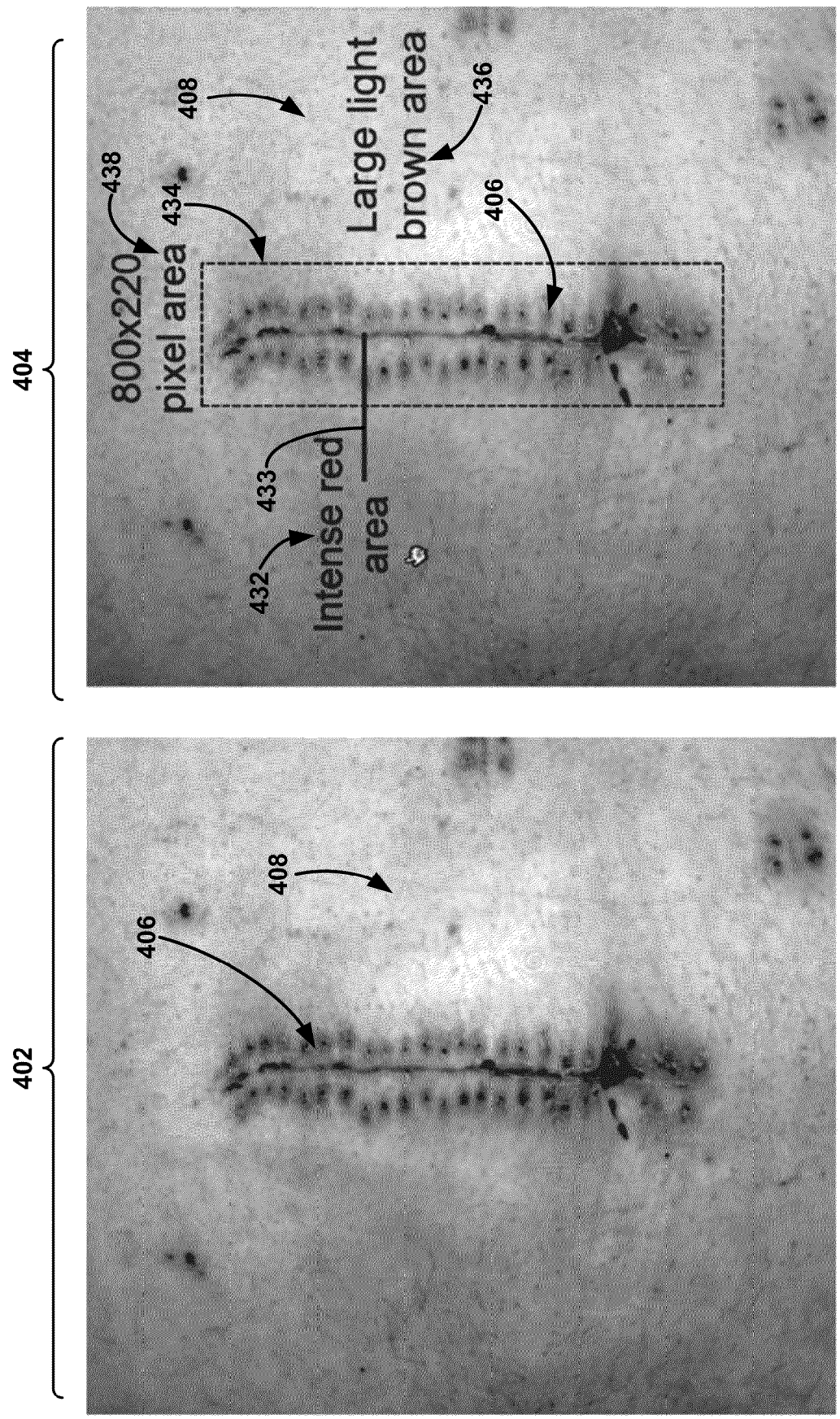
FIG. 4 is a conceptual diagram illustrating an image frame including contrasting colors and a modified image frame including contrasting colors, in accordance with one or more aspects of this disclosure.

FIG. 4 is a conceptual diagram illustrating an image frame 402 including contrasting colors and a modified image frame 404 including contrasting colors, in accordance with one or more aspects of this disclosure. In some examples, image frame 402 includes a first area 406 and a second area 408. Image frame 402 may represent a medical image, and first area 406 may include an incision in the skin of a patient and several marks where a suture once penetrated the skin of the patient. The incision and the suture marks may appear bright red, contrasting with the skin surrounding the incision and the suture marks.

Trigger content type identification module 214 may identify first area 406, and determine one or more characteristics of first area 406. For example, trigger content type identification module 214 may identify one or more parameter values corresponding to each pixel of a group of pixels corresponding to the first area 406. The one or more parameter values may include color values and/or luminance values. Trigger content type identification module 214 may determine one or more characteristics of first area 406 based on the parameter values of the group of pixels corresponding to first area 406. For example, trigger content type identification module 214 may determine that a substantial number of pixels corresponding to first area 406 comprise "red" color values.

Trigger content type identification module 214 may identify second area 408, and determine one or more characteristics of second area 408. For example, trigger content type identification module 214 may identify a group of pixels corresponding to second area 408, and identify one or more parameter values corresponding to each pixel of the group of pixels corresponding to second area 408. The one or more parameter values may include color values and/or luminance values. In some examples, second area 408 may include an area that completely surrounds first area 406. In some examples, second area 408 may include an area proximate to first area 406 but not surrounding first area 406. Trigger content type identification module 214 may determine one or more characteristics of second area 408 based on the parameter values of the group of pixels corresponding to second area 408. For example, trigger content type identification module 214 may determine that a substantial number of pixels corresponding to the second area 408 comprise "brown" color values.

In some examples, trigger content type identification module 214 may identify the red pixels of first area 406 as "intense." Additionally, or alternatively, trigger content type identification module 214 may identify the brown pixels of the second area 408 as "light." For example, a set of RGB color values for an intense red color may comprise (220, 25, 25). This color value is strongly weighted to the "R" color value in the RGB color scale, because the "R" color value is 220, whereas the "G" color value and the "B" color value are 25, which is significantly lower than 220.

Trigger content type identification module 214 may identify first area 406. Additionally, or alternatively, content type identification module 214 may determine a size of the first area 406. For example, when trigger content type identification module 214 identifies first area 406, trigger content type identification module 214 may determine a number of pixels within first area 406. Trigger content type identification module 214 determine a size of first area 406 so that the first area encloses all of the intense red tissue material corresponding to the incision and the suture marks. In some examples, trigger content type identification module 214 may determine the size of the first area 406 to include a rectangle of 800 × 220 pixels.

Data alteration system 230 may be configured to generate a first text label 432 to describe the one or more identified characteristics of first area 406. For example, content overlay module 234 may generate first text label 432 to include the text "Intense red area." In some examples, content overlay module 234 may execute machine learning model(s) 240 in order to arrange the words "red," "intense," and "area" in the order that they appear in FIG. 4. For example, a machine learning model may accept the identified characteristics "red" and "intense" as inputs, and the machine learning model may output the text "Intense red area" to describe first area 406. Computing system 102 may train the machine learning model based on a set of training data in order to develop the model to arrange words so that an object is accurately described. For example, "Intense red area" may be a better description of the first area 406 than "Red intense area" and "Area intense red."

In some examples, data alteration system 230 may be configured to generate line indicator 433 and box indicator 434 and overlay the line indicator 433 and the box indicator 434 on the image frame in order to indicate that the first text label 432 describes the first area 406. In some cases, without the line indicator 433 and box indicator 434, a viewer of the modified image frame 404 might mistakenly construe the first text label 432 as describing an area to the left of the incision and suture marks in first area 406, when the first text label 432 in fact describes characteristics of the incision and suture marks in first area 406. By generating line indicator 433 and box indicator 434 and overlaying these indicators on the image frame, data alteration system 230 may enclose the incision and the suture marks with the box indicator 434 and connect the area within the box indicator 434 and the first text label 432 with the line indicator 433.

Data alteration system 230 may be configured to generate a second text label 436 to describe the one or more identified characteristics of the second area 408. For example, content overlay module 234 may generate the second text label 436 to include the text "Large light brown area." Data alteration system 230 may add the descriptor "Large" to a second text label 436 because the second area 408 includes more pixels than the first area 406. Data alteration system 230 may be configured to generate a third text label 438 to indicate a pixel size of the first area 406.

Figure 5:
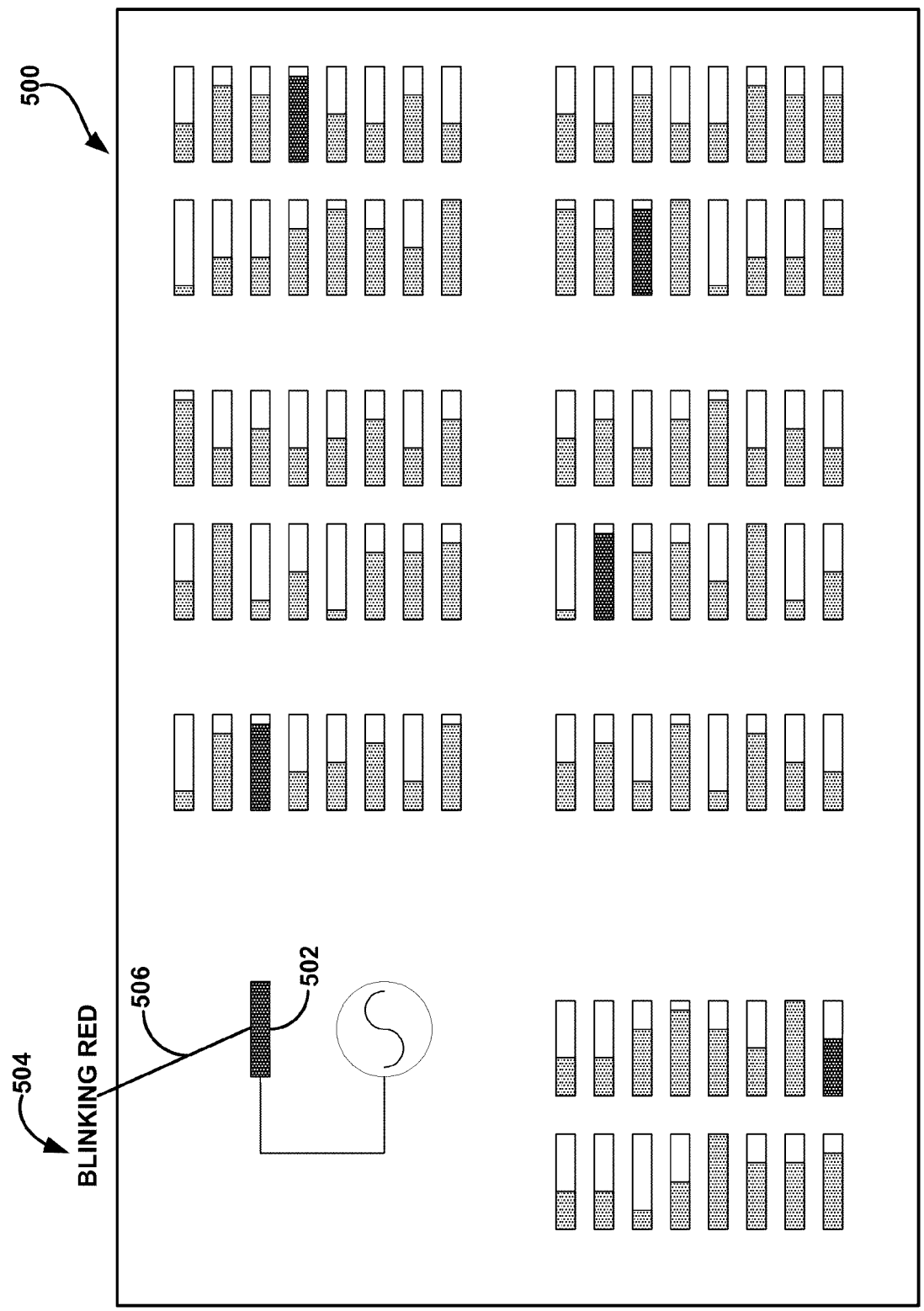
FIG. 5 is a conceptual diagram illustrating a modified industrial control warning screen, in accordance with one or more aspects of this disclosure.

FIG. 5 is a conceptual diagram illustrating a modified industrial control warning screen 500, in accordance with one or more aspects of this disclosure. As seen in FIG. 5, the modified industrial control warning screen 500 includes a warning light 502, a text label 504 and a line indicator 506. The modified industrial control warning screen 500 may indicate, over time, a status of one or more industrial system components over time. For example, when a component of the industrial system goes offline, or otherwise changes status, a light or an indicator on the modified industrial control warning screen 500 may change (e.g., change color, change luminance, start blinking, stop blinking, change a frequency of the blinking, or any combination thereof). These status changes may, in some cases, be difficult for a colorblind person to perceive. For example, a colorblind person might not be able to perceive a blinking red light on a screen. Consequently, it may be beneficial for computing system 102 to modify the industrial control warning screen with content describing lights and controls on the screen.

Trigger content type identification module 214 may identify warning light 502 as a group of pixels of the pixel array that forms the industrial control warning screen. Trigger content type identification module 214 may detect one or more characteristics of the warning light 502. For example, trigger content type identification module 214 may identify that the warning light 502 as red. By tracking the characteristics of the warning light 502 over a period of time, trigger content type identification module 214 may determine that the warning light is blinking. Data alteration system 230 may generate text label 504 and a line indicator 506 in order to identify a location of the warning light 502 and describe identified characteristics of the warning light 502. For example, data alteration system 230 may generate the text label 504 to include the text "Blinking Red" and overlay the text label 504 on the modified industrial control warning screen 500 proximate to the warning light 502. Data alteration system 230 may generate the line indicator 506 and overlay the line indicator 506 on the modified industrial control warning screen 500 in order to connect the text label 504 to the warning light 502.

Figure 6:
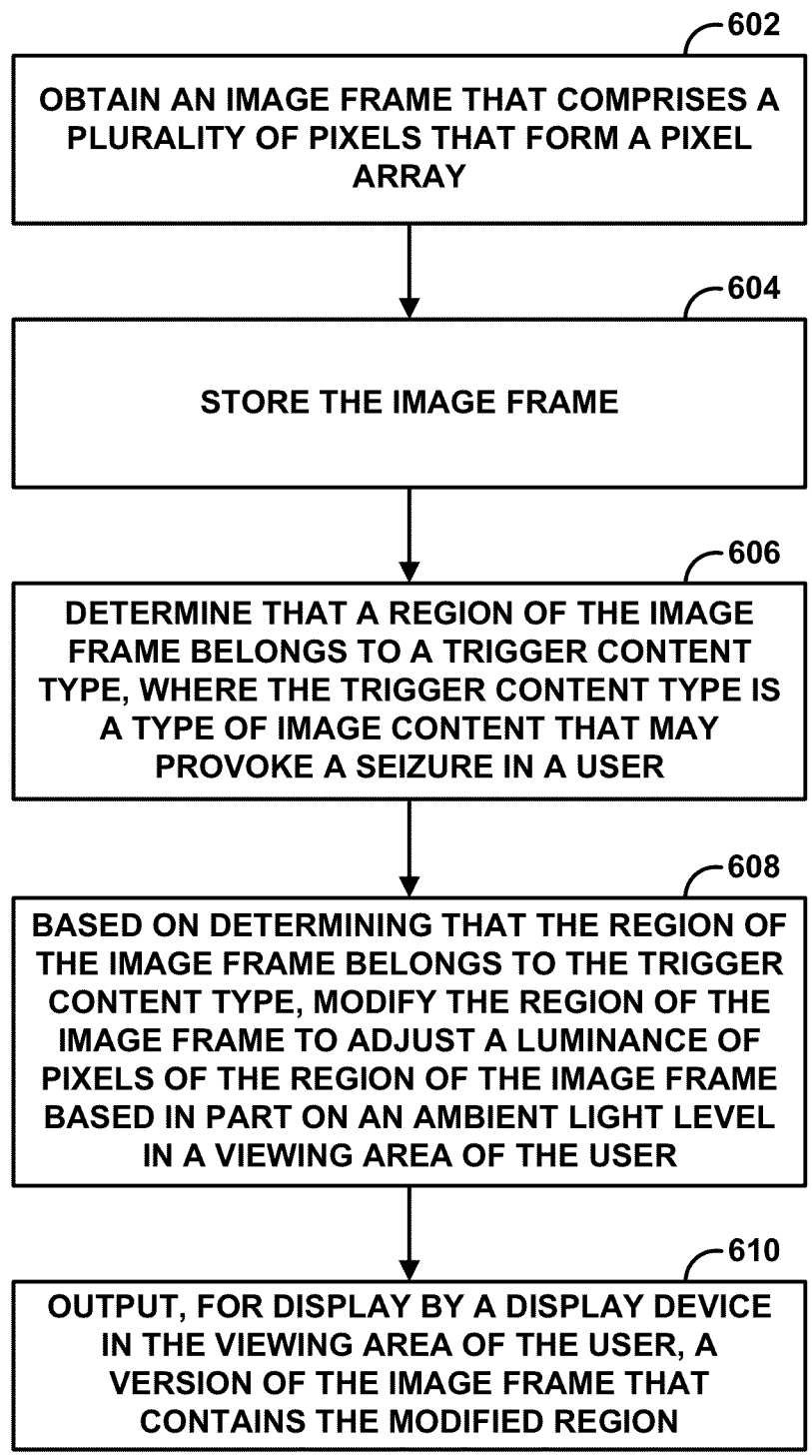
FIG. 6 is a flow diagram illustrating an example operation for processing video data to perform one or more actions, in accordance with one or more aspects of this disclosure.

FIG. 6 is a flow diagram illustrating an example operation for processing video data to perform one or more actions, in accordance with one or more aspects of this disclosure. The operation shown in this flowchart is provided as an example. In other examples, operations may include more, fewer, or different actions, and/or actions may be performed in different orders. FIG. 6 is explained with reference to FIG. 1 through FIG. 5. However, in other examples, the actions described in FIG. 6 may be performed in other contexts and by other components.

In some examples, processing circuitry 112 of computing system 102 is configured to obtain an image frame that comprises a plurality of pixels that form a pixel array (602). In some examples, the pixel array may include a plurality of pixels each having one or more pixel parameters. Pixel parameters may include one or more color values (e.g., RGB values or CMYK values). In some examples, computing system 102 may compute a luminance value for a pixel based on one or more color values on the pixel. Processing circuitry 112 may store the image frame in storage device 114 of computing system 102 (604).

Processing circuitry 112 may determine that a region of the image frame belongs to a content trigger type, where the trigger content type is a type of image content that may provoke a seizure in a user (606). In some examples, the region of the image frame is a subset of the pixels that form the pixel array. That is, the subset of pixels may represent a group of pixels that are located on the pixel array proximate to each other. When the image frame is displayed, the group of pixels may depict one or more discernable objects. In some examples, as part of determining that the region of the image frame belongs to the trigger content type, processing circuitry 112 is configured to determine a first set of parameters that apply to an entire area of the image frame; and determine a second set of parameters that apply to the region of the image frame. Processing circuitry 112 may determine that the region of the image frame belongs to the trigger content type based on a comparison of the first set of parameters with the second set of parameters.

Based on determining that the region of the image frame belongs to the content type, processing circuitry 112 is configured to modify the region of the image frame to adjust a luminance of pixels of the region of the image frame based in part on an ambient light level in a viewing area of the user (608). In some examples, to modify the luminance of pixels of the region, processing circuitry 112 is configured to modify one or more color values of the pixels of the region. Processing circuitry 112 may receive information indicative of the ambient light in the viewing area from an ambient light sensor in the viewing area. Additionally, or alternatively, processing circuitry 112 may output, for display by display device 108 in the viewing area of user 110, a version of the image frame that contains the modified region (610).

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

The following paragraphs provide a non-limiting list of examples in accordance with techniques of this disclosure.

Example 1: A computing system comprising a storage device and processing circuitry having access to the storage device. The processing circuitry is configured to: obtain an image frame that comprises a plurality of pixels that form a pixel array, wherein the storage device is configured to store the image frame; and determine that a region of the image frame belongs to a trigger content type, wherein the region of the image frame is a subset of the pixels that form the pixel array, and wherein the trigger content type is a type of image content that may provoke a seizure in a user, and the processing circuitry is configured to. As part of determining that the region of the image frame belongs to the trigger content type, the processing circuitry is configured to determine a first set of parameters that apply to an entire area of the image frame; determine a second set of parameters that apply to the region of the image frame; and determine that the region of the image frame belongs to the trigger content type based on a comparison of the first set of parameters with the second set of parameters. Based on determining that the region of the image frame belongs to the trigger content type, the processing circuitry is configured to modify the region of the image frame to adjust a luminance of pixels of the region of the image frame based in part on an ambient light level in a viewing area of the user. The processing circuitry is configured to output, for display by a display device in the viewing area of the user, a version of the image frame that contains the modified region.

Example 2: The computing system of example 1, wherein the processing circuitry is configured to, as part of modifying the region of the image, modify one or more characteristics of pixels of the region in addition to the luminance of the pixels of the region.

Example 3: The computing system of any of examples 1-2, wherein the first set of parameters includes luminance values of the pixels of the image frame, wherein the second set of parameters includes luminance values of the pixels of the region of the image frame, wherein the processing circuitry is configured to, as part of modifying the region of the image frame: calculate a baseline luminance value for the plurality of pixels based on the luminance values of the pixels of the image frame; and modify, based on the baseline luminance value, the luminance values of the pixels of the region of the image frame so that each of the luminance values of the pixels of the region of the image frame does not exceed a threshold luminance value.

Example 4: The computing system of example 3, wherein the processing circuitry is configured to, as part of calculating the baseline luminance value: calculate the baseline luminance value as a mean luminance value of the luminance values of the pixels of the region; or calculate the baseline luminance value as a median luminance value of the luminance values of the pixels of the region, and wherein the processing circuitry is configured to, as part of modifying the region of the image frame: calculate the threshold luminance value based on the baseline luminance value so that the threshold luminance value is a factor of the baseline luminance value; identify one or more luminance values of the pixels of the region of the image frame that are greater than the baseline luminance value; and decrease the one or more luminance values of the pixels of the region of the image frame that are greater than the baseline luminance value to the threshold baseline luminance value.

Example 5: The computing system of example 4, wherein the processing circuitry is further configured to: receive information indicative of the ambient light level in the viewing area of the user; and calculate the threshold luminance value further based on the ambient light level in the viewing area of the user.

Example 6: The computing system of any of examples 1-5, wherein the processing circuitry is further configured to: generate a text label based on the second set of parameters for display by a user interface; and output the text label for display by the user interface.

Example 7: The computing system of example 6, wherein the processing circuitry is configured to, as part of generating the text label: identify a set of descriptors that describe the second set of parameters; and arrange the set of descriptors into a text string to form the text label, and wherein the processing circuitry is configured to, as part of outputting the text label to the user interface: output the text label for display by the user interface over the pixel array so that the text label is located proximate to the region of the image frame.

Example 8: The computing system of any of examples 1-7, wherein the first set of parameters comprises color data corresponding to the pixels of the image frame, wherein the second set of parameters comprises color data corresponding to the pixels of the region of the image frame, and wherein the processing circuitry is further configured to: calculate a first model color value for the pixels of the image frame based on the color data corresponding to the pixels of the image frame; calculate a second model color value for the pixels of the region of the image frame based on the color data of the pixels of the region of the image frame; compare the first model color value with the second model color value; determine, based on the first model color value and the second model color value, whether the region of the image frame comprises a contrasting color area; generate, in response to determining that the region of the image frame comprises the contrasting color area, a text label based on the first model color value and the second model color value; and output the text label for display by the user interface.

Example 9: The computing system of any of examples 1-8, wherein the second set of parameters includes any one or combination of a luminance of the pixels of the region of the image frame, a color of the pixels of the region of the image frame, a location of the pixels of the region of the image frame, and a size of the region of the image frame.

Example 10: The computing system of any of examples 1-9, wherein the image frame comprises a first image frame of a sequence of image frames, wherein the region of the image frame is a first region of a sequence of pixel arrays, and wherein the processing circuitry is further configured to: receive video data comprising the sequence of image frames, wherein each image frame of the sequence of image frames includes a respective pixel array of the sequence of pixel arrays; and track a group of pixels corresponding to the region of the image frame through the sequence of pixel arrays in order to identify one or more time-varying parameters of the group of pixels through the sequence of pixel arrays.

Example 11: The computing system of example 10, wherein the one or more time-varying parameters include any one or combination of a luminance of the group of pixels through the sequence of pixel arrays, a color of the group of pixels through the sequence of pixel arrays, a location of the group of pixels through the sequence of pixel arrays, and a size of the group of pixels through the sequence of pixel arrays.

Example 12: The computing system of example 11, wherein the one or more time-varying parameters include the luminance of the group of pixels through the sequence of pixel arrays, and wherein the processing circuitry is configured to: identify, based on the luminance of the group of pixels through the sequence of pixel arrays, that the group of pixels alternate between one or more low luminance values and one or more high luminance values; and perform the one or more actions based on identifying that the group of pixels are alternating between one or more low luminance values and one or more high luminance values.

Example 13: The computing system of any of examples 11-12, wherein the one or more time-varying parameters include the location of the group of pixels through the sequence of pixel arrays, and wherein the processing circuitry is configured to: identify, based on the location of the group of pixels through the sequence of pixel arrays, a movement of the group of pixels; and perform the one or more actions based on identifying the movement of the group of pixels.

Example 14: The computing system of any of examples 11-13, wherein the one or more time-varying parameters include the luminance of the group of pixels through the sequence of pixel arrays, and wherein the processing circuitry is configured to: determine, based on the luminance of the group of pixels through the sequence of pixel arrays, that the luminance of the group of pixels is greater than a threshold luminance through the sequence of pixel arrays; and perform the one or more actions based on determining that the luminance of the group of pixels is greater than the threshold luminance through the sequence of pixel arrays.

Example 15: A method comprises obtaining, by processing circuitry having access to a storage device, an image frame that comprises a plurality of pixels that form a pixel array; storing, by the storage device, the image frame; and determining, by the processing circuitry, that a region of the image frame belongs to a trigger content type, wherein the region of the image frame is a subset of the pixels that form the pixel array, and wherein the trigger content type is a type of image content that may provoke a seizure in a user. As part of determining that the region of the image frame belongs to the trigger content type, the method comprises: determining a first set of parameters that apply to an entire area of the image frame; determining a second set of parameters that apply to the region of the image frame; and determining that the region belongs to the trigger content type based on a comparison of the first set of parameters with the second set of parameters. Based on determining that the region of the image frame belongs to the trigger content type, the method comprises modifying, by the processing circuitry, the region of the image frame to adjust a luminance of pixels of the region of the image frame based in part on an ambient light level in a viewing area of the user. Additionally, the method comprises outputting, by the processing circuitry for display by a display device in the viewing area of the user, a version of the image frame that contains the modified region.

Example 16: The method of example 15, wherein modifying the region of the image comprises modifying one or more characteristics of pixels of the region in addition to the luminance of the pixels of the region.

Example 17: The method of any of examples 15-16, wherein the first set of parameters includes luminance values of the pixels of the image frame, wherein the second set of parameters includes luminance values of the pixels of the region of the image frame, wherein the method comprises, wherein modifying the region of the image frame comprises: calculating a baseline luminance value for the plurality of pixels based on the luminance values of the pixels of the image frame; and modifying, based on the baseline luminance value, the luminance values of the pixels of the region of the image frame so that each of the luminance values of the pixels of the region of the image frame does not exceed a threshold luminance value.

Example 18: The method of any of examples 15-17, wherein the method further comprises: generating a text label based on the second set of parameters for display by a user interface; and outputting the text label for display by the user interface.

Example 19: The method of examples 15-18, wherein the image frame comprises a first image frame of a sequence of image frames, wherein the region of the image frame is a first region of a sequence of pixel arrays, and wherein the method further comprises: receiving, by the processing circuitry, video data comprising the sequence of image frames, wherein each image frame of the sequence of image frames includes a respective pixel array of the sequence of pixel arrays; and tracking, by the processing circuitry, a group of pixels corresponding to the region of the image frame through the sequence of pixel arrays in order to identify one or more time-varying parameters of the group of pixels through the sequence of pixel arrays.

Example 20: A computer-readable medium comprises instructions that, when executed by a processor, causes the processor to: obtain an image frame that comprises a plurality of pixels that form a pixel array; store the image frame; and determine that a region of the image frame belongs to a trigger content type, wherein the region of the image frame is a subset of the pixels that form the pixel array, and wherein the trigger content type is a type of image content that may provoke a seizure in a user. As part of determining that the region of the image frame belongs to the trigger content type, the instructions cause the processor to determine a first set of parameters that apply to an entire area of the image frame; determine a second set of parameters that apply to the region of the image frame; and determine that the region of the image frame belongs to the trigger content type based on a comparison of the first set of parameters with the second set of parameters. Based on determining that the region of the image frame belongs to the trigger content type, the instructions cause the processor to modify the region of the image frame to adjust a luminance of pixels of the region of the image frame based in part on an ambient light level in a viewing area of the user. Furthermore, the instructions cause the processor to output, for display by a display device in the viewing area of the user, a version of the image frame that contains the modified region.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computing system comprising:
a storage device; and
processing circuitry having access to the storage device and configured to:
obtain an image frame that comprises a plurality of pixels that form a pixel array, wherein the storage device is configured to store the image frame, wherein the image frame represents visible media data for display by a display device;
determine that a region of the image frame belongs to a trigger content type, wherein the region of the image frame is a subset of the plurality of pixels that form the pixel array, and the processing circuitry is configured to, as part of determining that the region of the image frame belongs to the trigger content type:
determine a first set of parameters that apply to an entire area of the image frame;
determine a second set of parameters that apply to the region of the image frame; and
determine that the region of the image frame belongs to the trigger content type based on a comparison of the first set of parameters with the second set of parameters;
determine an ambient light level of a viewing area in which the display device is located;
based on the determining that the region of the image frame belongs to the trigger content type, modify the region of the image frame to adjust a luminance of the subset of the plurality of pixels of the region of the image frame based in part on the ambient light level; and
output, for display by the display device, a version of the image frame that contains the modified region.

2. The computing system of claim 1, wherein the processing circuitry is configured to, as part of modifying the region of the image frame, modify one or more characteristics of the subset of the plurality of pixels of the region of the image frame in addition to the luminance of the subset of the plurality of pixels of the region of the image frame.

3. The computing system of claim 1,
wherein the first set of parameters includes luminance values of the plurality of pixels of the image frame,
wherein the second set of parameters includes luminance values of the subset of the plurality of pixels of the region of the image frame,
wherein the processing circuitry is configured to, as part of modifying the region of the image frame:
calculate a baseline luminance value based on the luminance values of the plurality of pixels of the image frame; and
modify, based on the baseline luminance value, the luminance values of the subset of the plurality of pixels of the region of the image frame so that none of the luminance values of the subset of the plurality of pixels of the region of the image frame exceeds a threshold luminance value.

4. The computing system of claim 3, wherein the processing circuitry is configured to, as part of calculating the baseline luminance value:
calculate the baseline luminance value as a mean or as a median luminance value of the luminance values of the subset of the plurality of pixels of the region, and
wherein the processing circuitry is configured to, as part of modifying the region of the image frame:
calculate the threshold luminance value based on the baseline luminance value;
identify one or more luminance values of the subset of the plurality of pixels of the region of the image frame that are greater than the baseline luminance value; and
decrease the one or more luminance values of the subset of the plurality of pixels of the region of the image frame that are greater than the baseline luminance value to the threshold luminance value.

5. The computing system of claim 4, wherein the processing circuitry is further configured to
calculate the threshold luminance value further based on the ambient light level.

6. The computing system of claim 1, wherein the processing circuitry is further configured to:
generate a text label based on the second set of parameters for display by the display device; and
output the text label for display by the display device.

7. The computing system of claim 6,
wherein the processing circuitry is configured to, as part of generating the text label:
identify a set of descriptors that describe the second set of parameters; and
arrange the set of descriptors into a text string to form the text label, and
wherein the processing circuitry is configured to, as part of outputting the text label to the display device:
output the text label for display by the display device over the pixel array so that the text label is located proximate to the region of the image frame.

8. The computing device of claim 1, wherein the first set of parameters comprises color data corresponding to the plurality of pixels of the image frame, wherein the second set of parameters comprises color data corresponding to the subset of the plurality of pixels of the region of the image frame, and wherein the processing circuitry is further configured to:
calculate a first model color value for the plurality of pixels of the image frame based on the color data corresponding to the plurality of pixels of the image frame;
calculate a second model color value for the subset of the plurality of pixels of the region of the image frame based on the color data corresponding to the subset of the plurality of pixels of the region of the image frame;
compare the first model color value with the second model color value;
determine, based on the first model color value and the second model color value, whether the region of the image frame comprises a contrasting color area;
generate, in response to determining that the region of the image frame comprises the contrasting color area, a text label based on the first model color value and the second model color value; and output the text label for display by the display device.

9. The computing system of claim 1, wherein the second set of parameters includes at least one of a luminance of the subset of the plurality of pixels of the region of the image frame, a color of the subset of the plurality of pixels of the region of the image frame, a location of the subset of the plurality of pixels of the region of the image frame, or a size of the region of the image frame.

10. The computing system of claim 1, wherein the image frame comprises a first image frame of a sequence of image frames, wherein the region of the image frame is a first region of a sequence of pixel arrays, and wherein the processing circuitry is further configured to:

receive video data comprising the sequence of image frames, wherein each image frame of the sequence of image frames includes a respective pixel array of the sequence of pixel arrays; and track a group of pixels corresponding to the region of the image frame through the sequence of pixel arrays in order to identify one or more time-varying parameters of the group of pixels through the sequence of pixel arrays.

11. The computing system of claim 10, wherein the one or more time-varying parameters include at least one of a luminance of the group of pixels through the sequence of pixel arrays, a color of the group of pixels through the sequence of pixel arrays, a location of the group of pixels through the sequence of pixel arrays, or a size of the group of pixels through the sequence of pixel arrays.

12. The computing system of claim 11, wherein the one or more time-varying parameters include the luminance of the group of pixels through the sequence of pixel arrays, and wherein the processing circuitry is configured to:

identify, based on the luminance of the group of pixels through the sequence of pixel arrays, that the group of pixels alternate between one or more low luminance values and one or more high luminance values; and modify the group of pixels based on identifying that the group of pixels are alternating between one or more low luminance values and one or more high luminance values.

13. The computing system of claim 11, wherein the one or more time-varying parameters include the location of the group of pixels through the sequence of pixel arrays, and wherein the processing circuitry is configured to:

identify, based on the location of the group of pixels through the sequence of pixel arrays, a movement of the group of pixels; and modify the group of pixels based on identifying the movement of the group of pixels.

14. The computing system of claim 11, wherein the one or more time-varying parameters include the luminance of the group of pixels through the sequence of pixel arrays, and wherein the processing circuitry is configured to:

determine, based on the luminance of the group of pixels through the sequence of pixel arrays, that the luminance of the group of pixels is greater than a threshold luminance through the sequence of pixel arrays; and modify the group of pixels based on determining that the luminance of the group of pixels is greater than the threshold luminance through the sequence of pixel arrays.

15. A method comprising:

obtaining, by processing circuitry having access to a storage device, an image frame that comprises a plurality of pixels that form a pixel array;

storing, by the storage device, the image frame, wherein the image frame represents visible media data for display by a display device;

determining, by the processing circuitry, that a region of the image frame belongs to a trigger content type, wherein the region of the image frame is a subset of the plurality of pixels that form the pixel array;

as part of determining that the region of the image frame belongs to the trigger content type, the method comprises:

determining a first set of parameters that apply to an entire area of the image frame;

determining a second set of parameters that apply to the region of the image frame; and determining that the region of the image frame belongs to the trigger content type based on a comparison of the first set of parameters with the second set of parameters;

determining an ambient light level of a viewing area in which the display device is located;

based on the determining that the region of the image frame belongs to the trigger content type, modifying, by the processing circuitry, the region of the image frame to adjust a luminance of the subset of the plurality of pixels of the region of the image frame based in part on the ambient light level; and outputting, by the processing circuitry for display by the display device, a version of the image frame that contains the modified region.

16. The method of claim 15, wherein modifying the region of the image frame comprises modifying one or more characteristics of the subset of the plurality of pixels of the region in addition to the luminance of the subset of the plurality of pixels of the region of the image frame.

17. The method of claim 15, wherein the first set of parameters includes luminance values of the plurality of pixels of the image frame, wherein the second set of parameters includes luminance values of the subset of the plurality of pixels of the region of the image frame, wherein modifying the region of the image frame comprises:

calculating a baseline luminance value based on the luminance values of the plurality of pixels of the image frame; and modifying, based on the baseline luminance value, the luminance values of the subset of the plurality of pixels of the region of the image frame so that none of the luminance values of the pixels of the subset of the plurality of region of the image frame exceed a threshold luminance value.

18. The method of claim 15, wherein the method further comprises:

generating a text label based on the second set of parameters for display by the display device; and outputting the text label for display by the display device.

19. The method of claim 15, wherein the image frame comprises a first image frame of a sequence of image frames, wherein the region of the image frame is a first region of a sequence of pixel arrays, and wherein the method further comprises:

receiving, by the processing circuitry, video data comprising the sequence of image frames, wherein each image frame of the sequence of image frames includes a respective pixel array of the sequence of pixel arrays; and tracking, by the processing circuitry, a group of pixels corresponding to the region of the image frame through the sequence of pixel arrays in order to identify one or more time-varying parameters of the group of pixels through the sequence of pixel arrays.

20. A computer-readable medium comprising instructions that, when executed by a processor, causes the processor to:
   obtain an image frame that comprises a plurality of pixels that form a pixel array;
   store the image frame, wherein the image frame represents visible media data for display by a display device;
   determine that a region of the image frame belongs to a trigger content type, wherein the region of the image frame is a subset of the plurality of pixels that form the pixel array;
   as part of determining that the region of the image frame belongs to the trigger content type:
      determine a first set of parameters that apply to an entire area of the image frame;
      determine a second set of parameters that apply to the region of the image frame; and
      determine that the region of the image frame belongs to the trigger content type based on a comparison of the first set of parameters with the second set of parameters; determine an ambient light level of a viewing area in which the display device is located;
   based on the determining that the region of the image frame belongs to the trigger content type, modify the region of the image frame to adjust a luminance of the subset of the plurality of pixels of the region of the image frame based in part on the ambient light level; and
   output, for display by the display device, a version of the image frame that contains the modified region.

* * * * *